(12) United States Patent
Efird et al.

(10) Patent No.: US 11,403,724 B2
(45) Date of Patent: Aug. 2, 2022

(54) VEHICLE CONTROL SYSTEM AND METHODS

(71) Applicant: Transportation IP Holdings, LLC, Norwalk, CT (US)

(72) Inventors: Nanette Efird, Atlanta, GA (US); Milan Karunaratne, Orange, CA (US); Nathan Thomas North, Seattle, WA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 172 days.

(21) Appl. No.: 16/679,968

(22) Filed: Nov. 11, 2019

(65) Prior Publication Data
US 2020/0074575 A1 Mar. 5, 2020

Related U.S. Application Data

(63) Continuation-in-part of application No. 15/055,567, filed on Feb. 27, 2016, now Pat. No. 10,474,984.
(Continued)

(51) Int. Cl.
*G06Q 50/30* (2012.01)
*G06Q 30/04* (2012.01)
(Continued)

(52) U.S. Cl.
CPC .......... *G06Q 50/30* (2013.01); *B60L 53/665* (2019.02); *B60L 58/10* (2019.02); *G05D 1/0212* (2013.01);
(Continued)

(58) Field of Classification Search
CPC .......... G06Q 50/30; G06Q 10/0833
See application file for complete search history.

(56) References Cited

U.S. PATENT DOCUMENTS

2001/0047237 A1* 11/2001 Nakagawa ............. G08G 1/202
701/533
2002/0059075 A1* 5/2002 Schick ................... G06Q 10/06
705/305

(Continued)

*Primary Examiner* — Rokib Masud
(74) *Attorney, Agent, or Firm* — The Small Patent Law Group LLC; Mary D. Lawlor

(57) ABSTRACT

A control system includes one or more processors that are configured to obtain event data associated with a vehicle. The one or more processors are also configured to receive a statement including a designated chargeable usage of the vehicle, with the statement issued by an entity, and the one or more processors further configured to access one or more rules dictating rule-based chargeable usage of the vehicle. The one or more processors are configured to compare the event data with the one or more rules to determine the rule-based chargeable usage of the vehicle based on the event data and to compare the rule-based chargeable usage with the designated chargeable usage to identify one or more discrepancies between the rule-based chargeable usage and the designated chargeable usage. Further, the one or more processors are configured to, responsive to identifying the one or more discrepancies, generate a reconciliation request for correcting the one or more discrepancies and communicate the reconciliation request to the entity that issued the statement.

21 Claims, 15 Drawing Sheets

Related U.S. Application Data

(60) Provisional application No. 62/876,215, filed on Jul. 19, 2019, provisional application No. 62/126,305, filed on Feb. 27, 2015.

(51) Int. Cl.
  *B60L 53/66* (2019.01)
  *G05D 1/02* (2020.01)
  *B60L 58/10* (2019.01)
  *G06Q 10/08* (2012.01)

(52) U.S. Cl.
  CPC ......... *G06Q 10/0833* (2013.01); *G06Q 30/04* (2013.01)

(56) References Cited

U.S. PATENT DOCUMENTS

| | | |
|---|---|---|
| 2008/0258936 A1 | 10/2008 | Chitor et al. |
| 2010/0274432 A1* | 10/2010 | Dlugoss ................ G07C 5/085 701/31.4 |
| 2014/0026089 A1 | 1/2014 | Linton et al. |
| 2014/0089030 A1 | 3/2014 | Bell |
| 2014/0089031 A1 | 3/2014 | Bell |
| 2014/0089032 A1 | 3/2014 | Bell |
| 2015/0051941 A1 | 2/2015 | Bell |

\* cited by examiner

VEHICLE CONTROL SYSTEM AND METHODS

CROSS-REFERENCE TO RELATED APPLICATIONS

This application is a continuation-in-part of and claims priority to U.S. Non-Provisional Application Ser. No. 15/055,567, filed 27 Feb. 2016, and titled "Vehicle Control System and Methods," which in turn claims priority to U.S. Provisional Application Ser. No. 62/126,305, filed 27 Feb. 2015, and titled "System And Method For Managing Asset Utilization." This application also claims priority to U.S. Provisional Application Ser. No. 62/876,215, filed 19 Jul. 2019, and titled "Vehicle Control System." The entirety of the Ser. Nos. 15/055567, 62/126,305, and 62/876,215 applications is incorporated herein by reference.

TECHNICAL FIELD

Embodiments of the subject matter disclosed herein relate to managing costs associated with usage of a vehicle.

BACKGROUND

In logistics, and particularly freight transport, costs can vary according to a timing of events. Excess fees can be leveraged for events that are delayed beyond an allotted time. Similarly, credits or discounts can be earned for events that transpire quickly. In freight transports, for example, various vehicles can be utilized by shippers for the transportation of goods and cargo. These vehicles can be leased to shippers by owners and delivered, to the shippers, by carriers for utilization by the shippers.

Extra costs can be incurred by shippers for elapsed time while vehicles are loaded and/or unloaded. Additionally, costs can accrue for vehicles that are available for loading and/or unloading, but that are undeliverable to the shippers for loading and/or unloading due to limited capacities of the shippers. These elapsed times are generally defined as time periods that begin when vehicles are delivered to the shippers for action by the shippers and that end when the vehicles are released back to carriers or owners, and are often referred to as demurrage or storage.

Various events or circumstances surrounding delivery and release of vehicles can affect the costs associated with demurrage and/or storage. Thus, procedures followed in management of vehicles can impact overall costs to shippers for the transportation of goods and cargo.

BRIEF DESCRIPTION

In one embodiment, a control system includes one or more processors that are configured to obtain event data associated with a vehicle. The one or more processors are also configured to receive a statement including a designated chargeable usage of the vehicle, with the statement issued by an entity, and the one or more processors further configured to access one or more rules dictating rule-based chargeable usage of the vehicle. The one or more processors are configured to compare the event data with the one or more rules to determine the rule-based chargeable usage of the vehicle based on the event data and to compare the rule-based chargeable usage with the designated chargeable usage to identify one or more discrepancies between the rule-based chargeable usage and the designated chargeable usage. Further, the one or more processors are configured to, responsive to identifying the one or more discrepancies, generate a reconciliation request for correcting the one or more discrepancies and communicate the reconciliation request to the entity that issued the statement.

In one embodiment, a control system includes at least one electronic input device and one or more processors. The at least one electronic input device is configured to generate event data associated with a vehicle, wherein the event data relates to operation of the vehicle. The one or more processors are communicatively coupled with the at least one electronic input device and are configured to receive the event data from the at least one electronic input device. The one or more processors are also configured to receive a statement including a designated chargeable usage of the vehicle. The statement is issued by an entity. Further, the one or more processors are configured to access one or more rules dictating rule-based chargeable usage of the vehicle. The one or more processors are configured to compare the event data with the one or more rules to determine the rule-based chargeable usage of the vehicle based on the event data and to compare the rule-based chargeable usage with the designated chargeable usage to identify one or more discrepancies between the rule-based chargeable usage and the designated chargeable usage. Further, the one or more processors are configured to generate a reconciliation request for correcting the one or more discrepancies that are identified, and to communicate the reconciliation request to the entity that issued the statement.

In one embodiment, a method includes obtaining event data associated with a vehicle. The method also includes receiving a statement including a designated chargeable usage of the vehicle, the statement issued by an entity. Further, the method includes accessing one or more rules dictating rule-based chargeable usage of the vehicle. Also, the method includes comparing the event data with the one or more rules to determine the rule-based chargeable usage of the vehicle based on the event data. The method also includes comparing the rule-based chargeable usage with the designated chargeable usage to identify one or more discrepancies between the rule-based chargeable usage and the designated chargeable usage. Further, the method includes, responsive to identifying the one or more discrepancies, generating a reconciliation request for correcting the one or more discrepancies and communicating the reconciliation request to the entity that issued the statement.

BRIEF DESCRIPTION OF THE DRAWINGS

Reference is made to the accompanying drawings in which particular embodiments and further benefits of the inventive subject matter are illustrated as described in more detail in the description below, in which.

DETAILED DESCRIPTION

Figure 1:
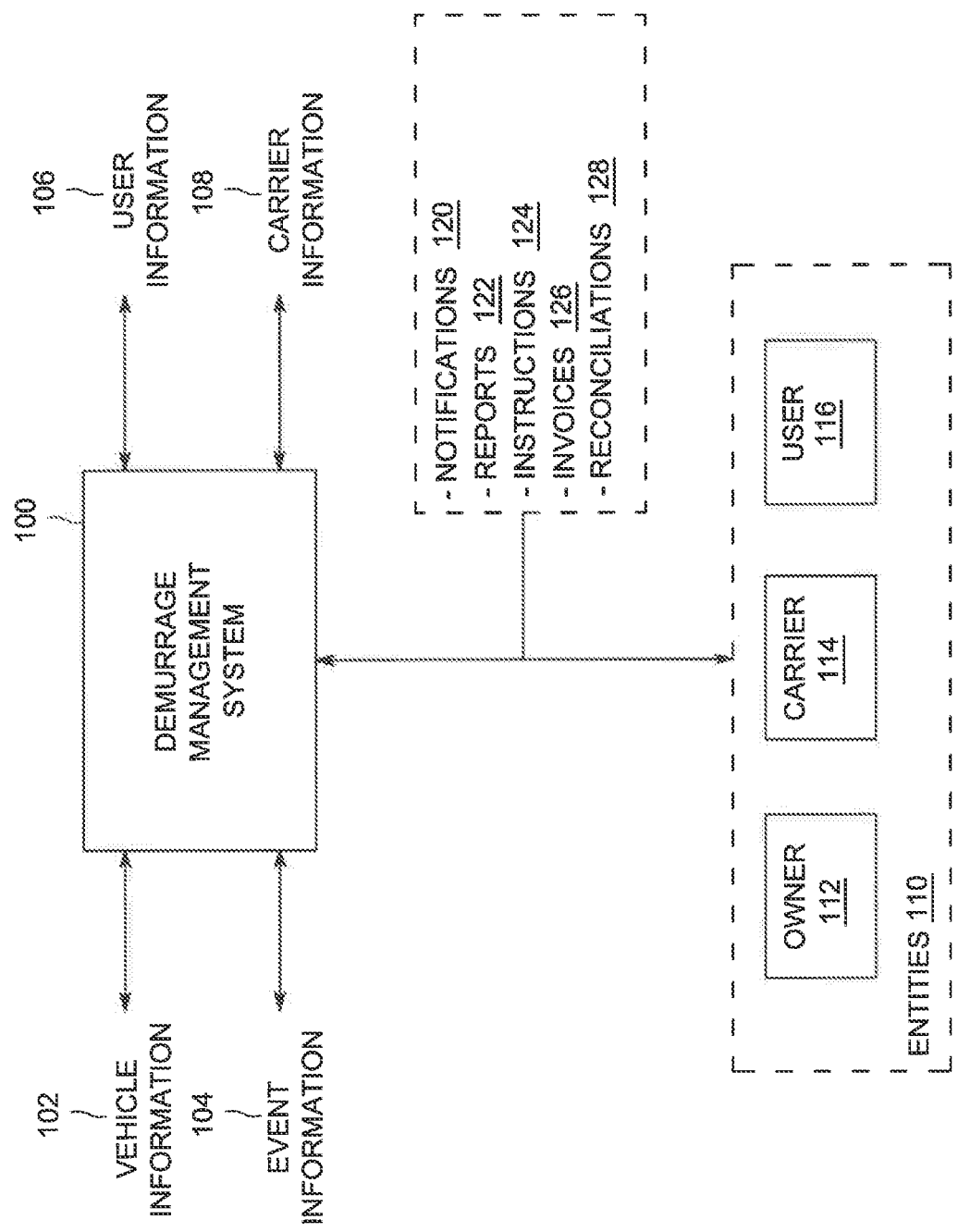
FIG. 1 illustrates a schematic block diagram of one embodiment of a demurrage management system.

Embodiments described herein generally relate to systems and methods for managing utilization of vehicles. The embodiments described can be applicable to management of vehicles employed in freight transport to provide accurate charges for usage of the vehicles. In particular, embodiments provide mechanisms to provide and support accurate charging for demurrage or storage of the vehicles. In freight transport, for instance, a time period subject to demurrage charges can be determined based on a time that a vehicle is provided to a shipper and a time that the vehicle is released back to an owner or carrier. For storage of the vehicles, the time period subject to charges can be determined based on a time the vehicle becomes available for placement with the shipper and the time the vehicle is actually placed with the shipper, for example. While placement and release (availability for placement and actual placement) generally define a time span subject to charges, various other events or circumstances related to the vehicle can alter the time span and, therefore, affect charges incurred.

Demurrage management systems and methods described herein reduce manual and laborious efforts to track vehicle movement, determine expected charges, and audit received invoices. Additionally, the demurrage management systems and methods herein enable fluid definition of demurrage characteristics and accurate invoicing of usage of vehicles. Further, the systems and methods described facilitate correction of errors or other discrepancies in actual invoices associated with vehicle usage.

A "vehicle," as utilized herein, includes one or more physical objects collectively employable to transport and/or store goods or cargo, either independently or with assistance from another machine or component. By way of example, vehicles can include, without limitation, self-propelling vehicles, vehicles incapable of propelling themselves, containers, or combinations thereof. For instance, a container detachably coupled to one or more vehicles for conveyance can collectively be a vehicle system. As utilized herein, a "container" includes an object that can hold or support another object such as a good, cargo, or another container. The vehicles can include containers conveyable via any transportation system including, but not limited to, systems for transport on ground (e.g., motorcycles, automobiles, trucks, busses, rail transport, etc.), watercraft (e.g., boats, ships) for transport on water, or aircraft (e.g., planes, rotorcrafts) for transport in air. A vehicle can be a single-compartment, permanently-arranged container conveyable via a transportation system. In rail transport, for instance, one form of a vehicle is a railcar. Other examples of vehicles include a ship, a semi-trailer, or an aircraft.

In one embodiment, a vehicle refers to a unit train. A unit train includes a rail vehicle system formed from two or more vehicles that conveys a single type of cargo or commodity. For example, a rail vehicle system having one or more locomotives and one or more railcars carrying the same type of cargo (e.g., coal, oil, milk, passengers, mail, etc.) can be a unit train.

A vehicle optionally can include a multiple-compartment, variably-arranged structure conveyable via a transportation system. Thus, a vehicle can include one or more component containers or vehicles, which are respectively interchangeably and detachably coupled to form, collectively, an asset. Accordingly, another form of a vehicle is a consist, which refers to plural vehicles linked for coordinated transport, such as a train of railcars or group of trailers, for example.

Usage of vehicles refers to one or more operations performed on or concerning vehicles, or any other interactions with or concerning vehicles. For instance, usage can include loading and unloading of goods and cargo to and from a vehicle. This type of usage can be referred to as demurrage.

Usage can also include holding or detaining a vehicle at a location. Demurrage can also include this type of usage; however, when disassociated from loading/unloading, can be referred to as storage. Vehicles can be rented or leased such that vehicle usage can be performed by entities other than vehicle owners. Such usage can be chargeable, e.g., subject to a charge, according to an amount of time the vehicle remains in possession of or available to the entities to perform the usage. A charge refers to an amount of an exchangeable object having a value. For example, a charge can be a monetary sum.

A time period over which usage of a vehicle is chargeable can be determined or monitored based on events associated with the vehicle. An event can reflect a status change for the vehicle where the vehicle transitions from a first state to a second state. In some states, chargeable time accrues. Accordingly, certain events operate to start a clock while other events operate to suspend or terminate the clock. Starting the clock can represent when charges for the vehicle start to accrue, while suspending or terminating the clock represent when the charges at least temporarily stop accruing for the vehicle.

Which states accrue chargeable time and which states do not accrue charges (and in turn which events respectively start, suspend, and terminate the clock) can be determined according to a set of rules. In an example, the set of rules can be rules tariff established by a carrier responsible for the transport of goods and cargo. In this example, the set of rules can be associated with the carrier such that all users of vehicles transported by the carrier are subject to similar rules. According to other examples, the set of rules can be respectively associated with a specific user, a specific vehicle, and/or a specific vehicle owner such that the set of rules are applied for that user, vehicle, and/or owner. To associate a charge to a period of time, a second set of rules can be employed. The second set of rules can be referred to, in some examples, as a billing schedule. The second set of rules can be a subset of the set of rules utilized to determine an amount of chargeable time.

Owners, carriers, and users can refer to particular roles or relationships with respect to a vehicle. An owner holds title to the vehicle and may have the ability to lease or rent the vehicle to others. A carrier may be responsible for transporting the vehicle or other cargo via one or more transportation systems. The carrier can deliver vehicles to users and/or pick up vehicles from users. A user may utilize the vehicle to hold or support goods or cargo for transportation by the carrier. These roles can be occupied by distinct entities, or one entity can inhabit more than one role. For instance, the carrier responsible for transport of the vehicle can also be the owner of the vehicle. In this instance, the user can be liable for charges when the vehicle is held in possession of or available to the user. In another example, the user of the vehicle can be the owner such that the user is liable for charges when the carrier makes accommodations to hold the vehicle at a location.

According to one or more embodiments of the inventive subject matter described herein, a demurrage management system monitors liabilities incurred by or owed to by users, owners, and carriers with respect to vehicles and verifies accurate billing for those liabilities. The demurrage management system tracks events associated with a vehicle or vehicles. With information corresponding to the events, the demurrage management system determines an amount of chargeable usage by the user. The amount of chargeable usage can be determined based on a set of rules (e.g., tariff rules), which can be universal set or a set respectively associated with at least of the user, a carrier, an owner, or the vehicle. The demurrage management system applies the set of rules to a timeline of events, as indicated by event data or event information collected, to generate the amount of chargeable usage. An expected charge or invoice amount can be generated based on the amount of chargeable usage and a second set of rules. The second set of rules can be a subset of the set of rules employed to generate the amount of chargeable usage, or a separate set of rules such as a billing schedule, for example.

The demurrage management system can receive an invoice from an owner or carrier for usage of the vehicle. The invoice is compared to the expected charge and/or the amount of chargeable usage to identify one or more discrepancies (e.g., differences). The discrepancy can relate to a difference between an invoiced amount and the expected charge, a difference between a usage time stated on the invoice and the determined chargeable usage, or both. Discrepancies can arise, for example, when an owner or carrier does not make allowances for particular events or circumstances when preparing the invoice. The demurrage management system can generate a report, based on the event data, to support a correction request to the owner and/or the carrier.

In a rail transport example, the user can be a shipper of goods or cargo and the carrier can be a railroad servicing the shipper with transportation by rail. In this context, a vehicle can be a railcar or a container in association with a railcar. The owner of the vehicle can be either the railroad or the shipper, which respectively implicate different subsets of rules in determinations of chargeable usage of the vehicle. For instance, pursuant to this example, the railroad invoices the shipper for a period of time the vehicle remains in possession of the shipper when the vehicle is railroad owned. When the vehicle is shipper owned, the railroad invoices the shipper for a period of time that the vehicle held by the railroad while awaiting instructions by the shipper to place the vehicle with the shipper. The railroad invoices the shipper in accordance with tariff rules associated with the railroad. The tariff rules, or portions thereof, can be universally applicable to all railroad customers, or specifically applicable to the shipper.

According to the rail transport example, the demurrage management system collects event data or event information pertaining to the vehicle. The event data is indicative of events corresponding to the vehicle and can include timestamps and descriptions for each event. Some events trigger accrual of demurrage or storage costs for the vehicle, while other events suspend or terminate the accrual of costs associated with the vehicle. Examples of events can include entry and/or exit of a vehicle into or out of a designated location (e.g., a rail yard, shipping platform, parking lot, etc.), repair of the vehicle, the vehicle remaining stationary for a designated period of time, completion of a trip by the vehicle, the vehicle embarking on a trip, the vehicle being loaded with cargo, cargo being unloaded from the vehicle, delivery of the vehicle to a designated area, movement of the vehicle toward a designated area, etc. An amount of time elapsed between an event triggering accrual and an event terminating accrual identifies an amount of usage of the vehicle by the shipper. The amount of time elapsed can be expressed in terms of a variety of units such as hours, days, weeks, or a unit defined according to the tariff rules. For instance, the rules can define a vehicle day as the unit of time to which charges are assigned. A vehicle day can be a twenty-four period or portion thereof commencing at a predetermined time. Each occurrence of the predetermined time following an event can count as a vehicle day. Thus, a total number of those occurrences is a number of vehicle days since the event occurred. The counting of the occurrences of the predetermined time can be referred to as a clock, which is triggered, suspending, and/or terminating according to events.

Vehicle days can be chargeable or non-chargeable in accordance with the tariff rules or credits held by the shipper. A rate for a chargeable vehicle day can be provided by a billing schedule of the tariff rules, or a separate billing schedule. The billing schedule can standard for the railroad or negotiated between the railroad and the shipper and, thus, applicable only to interactions therebetween. The billing schedule can include a variable or tiered rate such that a charge correlated with each chargeable vehicle day varies.

As discussed above, a sequence of events determines a number of vehicle days in accordance with the tariff rules. Thus, collection and analysis of event data forms a genesis of a billed charge. Some events may not impact vehicle days, but can be useful in reports to facilitate advanced planning. For instance, one event included in the event data is an event indicating a vehicle inbound to the shipper is being transported by the railroad. This event transitions the vehicle to an en route state, but does not affect vehicle days. Another example is an arrival event, which occurs when the vehicle arrives at a location (e.g., a rail yard) serving the shipper. This event transitions the vehicle to an active state, but does not trigger accrual of vehicle days. Therefore, the state of the vehicle may or may not be correlated or associated with whether vehicle days are accruing.

A placement event, however, can trigger the clock and, thus, begin the accrual of vehicle days. The placement event can be an actual placement or a constructive placement. Actual placement refers to physically placing the vehicle at a location accessible to the shipper or a location specified by the shipper. When the vehicle is railroad-owned, actual placement activates the counting of vehicle days. Constructive placement can be governed by the tariff rules and refers to a tender of the asset by the railroad when the vehicle cannot be actually placed. Constructive placement can occur with notification such that the railroad communicates to the shipper that the vehicle is available and effectively tendered as of a date of the communication. Constructive placement can occur without notification. For instance, the railroad can place the vehicle on a shipper-controlled track at a location inaccessible to the shipper. Constructive placement can trigger accrual of vehicle days. For shipper-owned assets, actual placement following constructive placement stop the accrual of vehicle days.

Other events can occur when the shipper issues instructions or orders to the railroad with respect to the vehicle. In some instances, these events can suspend or terminate the clock. For example, following constructive placement of the vehicle, an order for placement suspends the clock when the vehicle is railroad-owned. The clock resumes upon actual placement of the vehicle. For shipper-owned vehicles, the order for placement terminates the clock.

Another example of an event is associated with a request, from the shipper to the railroad, for a vehicle for outbound loading of goods or cargo. Under some tariff rules, this event does not directly impact vehicle days, but generates circumstances which can render an effect. For instance, the request can include a date specified by the shipper. When specified, the clock is not triggered until that date even when the vehicle is placed, actually or constructively, beforehand. When a date is not specified in the request, actual or constructive placement of the requested vehicle starts the clock.

Another type of instruction from the shipper to the railroad is a release, which is a notification that the vehicle is available to be pulled. The vehicle can be received as a loaded vehicle (e.g., a vehicle carrying cargo) but that is later released as an empty vehicle (e.g., a vehicle that is not carrying cargo or that is not carrying the same cargo as before). The vehicle can be received as a loaded vehicle and also released at a later time as a loaded vehicle. As another example, the vehicle can be received as an empty vehicle that is later released as a loaded vehicle. Or, the vehicle can be received as an empty vehicle that is later released as an empty vehicle. A loaded vehicle that is later released as a loaded vehicle can occur when the vehicle is unloaded after receipt and then reloaded before release, when the shipment being carried by the vehicle is refused, and/or when the vehicle is to be reshipped to another destination (while carrying the same or additional cargo). An empty vehicle that is released as an empty vehicle can occur when an ordered vehicle is no longer desired after receipt, or when the vehicle is unsuitable (e.g., dirty, wrong type, mechanical fault, etc.). The release can terminate the clock and ends the vehicle day or other accruing, chargeable time.

A pull event indicates when the railroad switches the vehicle from shipper-controlled track to railroad-controlled track. For shipper-owned vehicles pulled from shipper-controlled track without forwarding instructions, the clock can commence counting vehicle days until forwarding instructions are communicated from the shipper to the railroad.

Another example of an event is a relief claim. The shipper can request relief or exclusions from charges for vehicles under allowances specified in the tariff rules, for example. When a vehicle that is accessible or usable only in a particular orientation is placed incorrectly, relief can be available. Other grounds for relief include when the vehicle has a mechanical fault preventing usage of the vehicle, or when the vehicle is incorrectly placed (e.g., wrong location) by the railroad. Depending on the tariff rules applied, the relief claim can suspend the clock until the concern is remedied by the railroad. Alternatively, the relief claim can terminate the clock and expunge accrued vehicle days.

The above description of events and demurrage effects provide an example framework describing a manner in which tracked events and collected event data can lead to a determination of demurrage or storage charges according to one possible set of rules. Other tariff rules associated with different railroads, vehicle owners, shippers, vehicles, or the like, can involve modifications or exceptions to relevant events and effects above. In turn, different rules create different mechanics governing starting, stopping, and suspending the clock. Further, different rules generate varying invoiced amounts.

Based on collected event data, a timeline of a vehicle can be generated from which an amount of chargeable vehicle days can be determined. The demurrage management system calculates an expected charge for the amount of chargeable days, which can be compared to an invoiced amount provided by the railroad. When discrepancies arise, due to failure to account for exceptions for example, the demurrage management system can generate reports or other support documentation based at least in part on the collected event data. The reports or other documentation serves as evidence of the discrepancies to support a request for adjustment of the invoiced amount.

With reference to the drawings, the above noted features and embodiments are described in greater detail along with additional aspects and embodiments. Like reference numerals are used to refer to like elements throughout.

FIG. 1 illustrates a schematic block diagram of one embodiment of a demurrage management system 100. The demurrage management system 100 determines usage charges, such as for demurrage or storage, for one or more vehicles and/or reconciles discrepancies between determined usage charges and billed charges on invoices. The demurrage management system 100 operates on behalf of one or more entities 110 associated with the vehicles. The entities 110 can respectively occupy roles based on respective relationships to the vehicles. For instance, the entities 110 can operate as an owner 112 of a vehicle, a carrier 114 of the vehicle, and/or a user 116 of the vehicle. As described above, more than one role can be occupied by a single entity. For instance, the vehicle can carrier-owned such that a single entity is both the owner 112 and the carrier 114. Alternatively, the vehicle can be user-owned such that a single entity is both the owner 112 and the user 116.

The demurrage management system 100 receives or retrieves various pieces of information to determine vehicle usage and an expected charge for the determined vehicle usage. Vehicle information 102 indicates properties of the vehicle. For example, the vehicle information 102 can specify the owner 112 of the vehicle, a type of the vehicle, an identifier for the vehicle, hazardous status of the vehicle and/or cargo being carried by the vehicle, a usage history of vehicle, and/or the carrier 114 serving the vehicle. Event information 104 indicates events associated with the vehicle. As described above, the event information 104 can specify, for an event, a timestamp indicating when the event occurred and a description of the event. The event information 104 can be input by one or more of the entities 110. As described later, the event information 104 can also be input from a vehicle location or tracking system, such as a global positioning system (GPS) system onboard one or more vehicles. User information 106 includes data employable to identify the user 116. For instance, the user information 106 can specify an identity of user 116, a location of user 115, vehicle types usable by the user 116, carriers serving the user 116, capacity of the user 116, and/or special accommodations extended to the user 116. Carrier information 108 indicates characteristics of the carrier 114 serving the user 116 and responsible for transporting the vehicle.

The demurrage management system 100 can communicate with the entities 110 and, through those communications, exchange notifications 120, reports 122, instructions 124, invoices 126, and/or reconciliations 128. The notifications 120 can provide information regarding occurrences of events associated with the vehicles. The information can be autonomously provided to one or more of entities 110, or provided to a single entity for communication to other entities 110. For example, a notification of a release event can be provided to user 116 for communication to carrier 114. Notifications 120 can also be generated to convey relief claims, constructive placements, invoice discrepancies, vehicle orders, vehicle placement instructions, and/or forwarding instructions. Reports 122 provide detailed information according to a set of criteria. For instance, one report can provide an event history for the vehicle. Other reports include, but are not limited to, reports on accrued usage charges for the vehicle or cumulatively for all vehicles, listings of vehicles by state (e.g., active, inactive, en route, etc.), listings of possible exceptions for claiming, and/or reports regarding servicing of the user 116 by the carrier 114. Instructions 124 can be input to the demurrage management system 100 and include, without limitation, vehicle releases, forwarding instructions, placement orders, vehicle orders, relief requests, and reconciliation requests. Invoices 126 can be input to the demurrage management system 100 by carrier 114 or owner 112 for comparison to expected charges generated by the demurrage management system 100. When discrepancies are identified, the demurrage management system 100 can generate reconciliations 128 to correct the inconsistencies. Reconciliations 128, in an aspect, can include a request for adjustment as well as applicable notifications 120 or reports 122 supporting the request. In one embodiment, a reconciliation 128 may result in a change of a state or condition of a vehicle or cargo. For example, responsive to identifying a discrepancy that a user has been charged for a vehicle that has remained stationary due to a fault in the vehicle, another replacement vehicle may be moved to the location of the faulty vehicle (or another location) to replace the vehicle, repair of the vehicle may be ordered or initiated, or cargo that is onboard the vehicle or is scheduled to be loaded onto the vehicle may be loaded onto another vehicle.

The demurrage management system 100 and the entities 110 can communicate via the Internet, a local area network (LAN), a wide area network (WAN), or a combination thereof over one or more wired or wireless links. For example, the entities 110, via one or more computing devices, can connect wirelessly, via WiFi, cellular radio, or the like, to a first LAN or WAN. The first LAN or WAN, in turn, is connected via a cellular communication link or a wired link to the Internet. Also, connected to the Internet is a second LAN or WAN to which the demurrage management system 110 can be connected wired or wirelessly. The above connection scheme is an example of one possible setup and other network topologies are employable with the aspects described herein and the claimed subject matter. For instance, demurrage management system 100 can be implemented as a cloud-based or Internet-based system. Accordingly, the demurrage management service described herein can be a cloud service and, as such, a nebulous networking and/or computing structure, generally opaque to client computing devices, implements the demurrage management system 100 and enables access to the demurrage management system 100 by entities 110 via one or more exposure points (e.g., IP addresses, web addresses, network addresses, domain names, uniform resource indicators (URIs), application program interfaces (APIs), etc.). In this manner, the demurrage management system 100 can execute on one or more physical computing devices (i.e., hardware) located remotely from entities 110 such as in a data center or other installation. In addition, the demurrage management system 100 can also execute on one or more virtual machines, which in turn, execute on one or more physical computing devices. In this way, the demurrage management system 100 can be modified (e.g., relocated to different physical hardware, scaled up (e.g., given greater resources), scaled down (e.g., given less resources), etc., without disruption to entities 110 or the operations of the entities 110.

Figure 2:
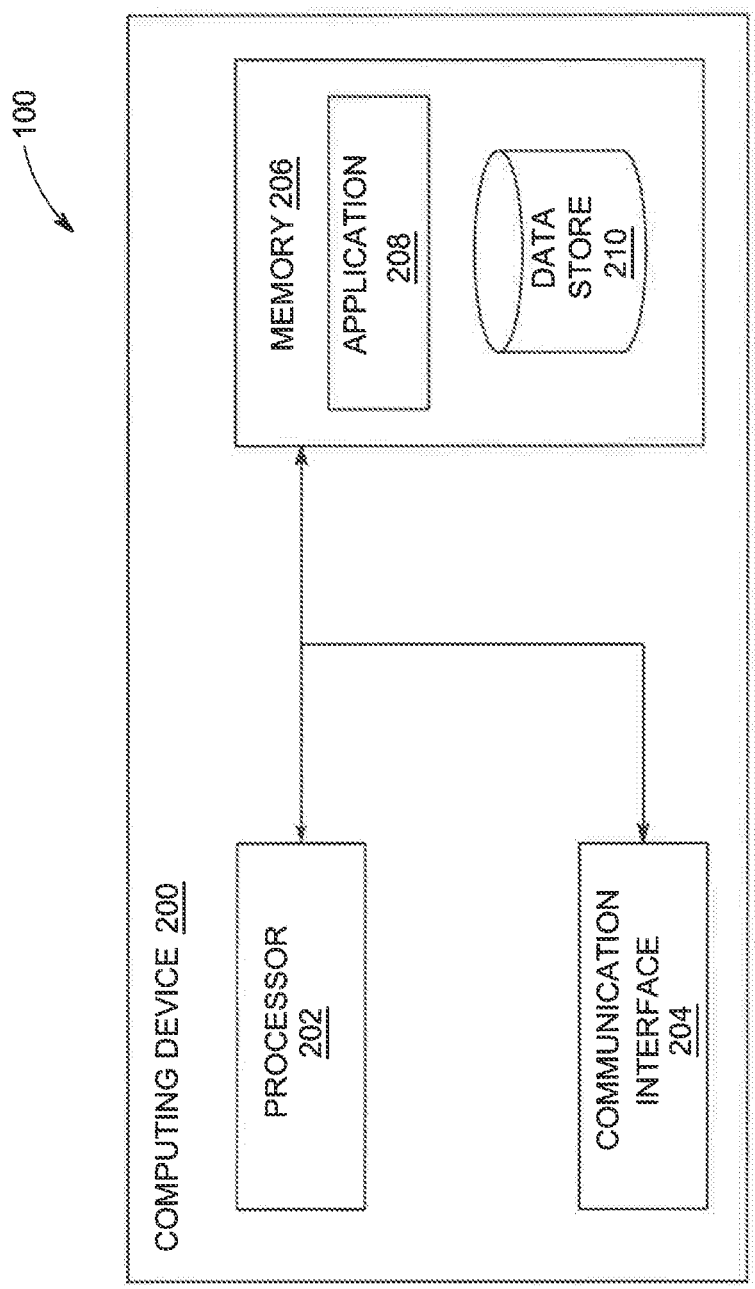
FIG. 2 illustrates another schematic block diagram of one embodiment of the demurrage management system shown in FIG. 1.

FIG. 2 illustrates a block diagram of one embodiment of the demurrage management system 100. The demurrage management system 100 may include one or more computing devices 200 having hardware circuitry that include and/or are electrically coupled with one or more processors 202 (e.g., microprocessors, field programmable gate arrays, integrated circuits, or other electronic logic-based devices). The processors 202 execute computer-executable instructions such as instructions forming application 208 to implement the demurrage management system 100. In one embodiment, the functions and operations described herein (which are at least partially provided in flow diagrams or flowcharts, prose, or other manners to provide details of the processor structure) can represent one or more algorithms that transform a general purpose computer or processor into a special purpose computer or processor that is programmed to perform the disclosed algorithm or algorithms. The processors 202 can perform the functions or operations described herein as being performed by the demurrage management system 100. Such computer-executable instructions can be stored on one or more computer-readable storage media including a non-transitory, computer-readable storage medium such as memory 206. The memory 206 can further include a data store 210 retaining various data described later. The application 208 can access the data retained by the data store 210.

The computing device 200 of the demurrage management system 100 includes a communication interface 204. As schematically depicted and described herein, a "communication interface" refers to a logical interface through which communication between at least two entities is established and conducted. The communication interface 204 incorporates an address or identifier to which transmission can be directed for reception by the entity utilizing the interface 204. The address or identifier also serves to identify an origin for transmission from the interface 204. As a logical interface, the communication interface 204 can include one or more protocols enabling the communication. These protocols can be layered (e.g., according to the OSI model). Further, these protocols can vary depending a medium of transmission. For example, the communication interface 204 can utilize a wired or wireless medium. To this end, as utilized herein, the communication interface 204 also includes physical interfaces and transmit/receive processing chains to implement the communication via the medium.

For example, the communication interface 204 can include physical wired or wireless interfaces such as, but not limited to, a USB interface, a serial interface, a WiFi interface, a short-range RF interface (Bluetooth), an infrared interface, a near-field communication (NFC) interface, an Ethernet interface, a fiber optic interface, a cellular radio interface, a satellite interface, etc.

The computing device 200 can be a single server or a group of servers operating jointly to support the application 208. As utilized herein, a "server" refers to a type of computing device having one or more computer processors coupled to a memory (e.g., a non-transitory, computer-readable storage medium) storing computer-executable instructions for providing a service or remote functionality to one or more client devices such devices associated with entities 110. The server can be a virtual machine including virtualized hardware elements executing on one or more physical computing devices. According to another embodiment, the server can be a package of computer-executable instructions and computer-readable data, which is executed on a virtual platform. The virtual platform can include a bundle of computing resources provided by one or more physical computing devices and can provide an execution environment for the application 208. In other words, the server can be provided as a cloud-based service and, further, can be provided on top of additional cloud computing services (e.g., platform-as-a-service, infrastructure-as-a-service, etc.).

Figure 3:
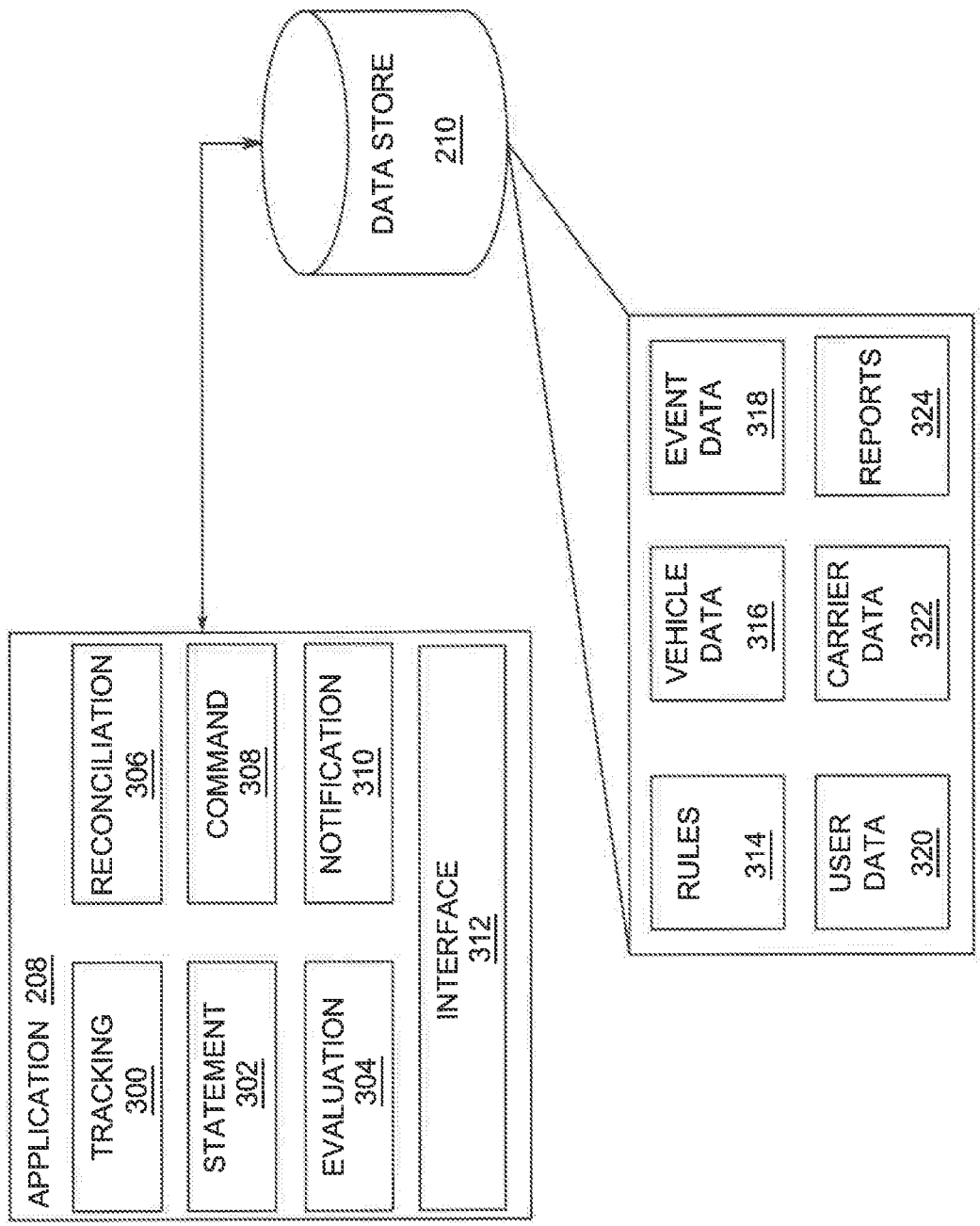
FIG. 3 illustrates a schematic block diagram of one embodiment of an application executed by the computing device to implement the demurrage management system shown in FIG. 1.

FIG. 3 illustrates a block diagram of one embodiment of operations of the processor 202 operating using the application 208 as executed by the computing device 200 to implement the demurrage management system 100. The processor 202 performs various operations based on the application 208, such as tracking events 300, generating statements 302, evaluation of invoices 304, reconciliation of statements and/or invoices 306, generation of commands 308, generation of notifications 310, and providing a user interface 312. The processor 202 is coupled (e.g., communicatively coupled and/or electrically coupled) to the data store 210, which stores retaining a set of rules 314, asset data 316, event data 318, user data 320, carrier data 322, and reports 324.

In operation, the demurrage management system 100 monitors events (e.g., tracking 300) associated with one or more vehicles. While the description herein focuses on a single vehicle, the description also may apply to multiple vehicles. The demurrage management system 100 tracks the events by receiving event information 104 and storing the event information 104 to the data store 210 as the event data 318. The event information 104 can be input manually by one or more of owner 112, carrier 114, or user 116 and received via the interface 312. For example, the demurrage management system 100 can generate a user interface 312 that is accessible with a web browser application executing on computing devices associated with one or more of the owner 112, carrier 114, or the user 116. The event information 104 can be provided to application 208 through such a web-based user interface. Alternatively, to generate the interface 312, the demurrage management system 100 can utilize one or more application program interfaces (APIs) associated with a vehicle location system to obtain the event information 104. In one embodiment, the interface 312 may include or represent transceiving circuitry that can communicate data via data signals sent over wired and/or wireless connections. For example, the interface 312 can include or represent an antenna and transceiving circuitry to wirelessly communicate data.

The demurrage management system 100 generate statements 302 by evaluating the event data 318 to determine an amount of usage of the vehicle in accordance with a set of rules 314, which may be stored in the memory 206. The processor 202 of the demurrage management system 100 can use the data bus of the processor 202 to access the rules from the memory 206 or from an internal memory of the processor 202. The processor 202 optionally may be referred to as a charge management processor or vehicle management processor. While the description herein focuses on a single processor 202 performing the various operations, the processor 202 may represent multiple processors 202 performing different operations, multiple processors 202 sharing in the performance of some or all of the same operations, or a single processor 202 performing the operations.

The processor 202 may generate statements 302 by associating an expected charge with the amount of usage based on at least a subset of the set of rules 314. For example, the arithmetic/logic unit (ALU) of the processor 202 can compare the amount of usage of the vehicle as received by the processor 202 with the rules to determine the expected charge. Increased amounts of usage and/or different vehicles may be associated with increased charges relative to lesser amounts of usage and/or other types of vehicles. The ALU of the processor 202 can determine the charges based on the types of vehicles and the amounts of usage of the vehicles.

In one example, the subset of the rules can include a billing schedule that dictates a rate at which vehicle usage is charged. The processor 202 can generate a statement report (e.g., statement 302) indicating the amount of usage and the expected charge, which is stored in data store 210 as one or more reports 324. In determining the amount of usage of the asset, the processor 202 (e.g., the ALU of the processor 202) can identify one or more exceptions, events, or circumstances which, according to the rules 314, alter the amount of usage of a vehicle for the statement 302. The ALU of the processor 202 can alter the amount of usage by comparing the exceptions, events, or circumstances applicable to the vehicle and received by the processor 202 to the rules to determine if any of the exceptions, events, or circumstances match or otherwise correspond with a rule that reduces or increases the amount of usage. The processor 202 can generate an exceptions report as part or separate from the statement 302, which also may be stored in the data store 210 or in another location.

The processor 202 can evaluate 304 invoices by comparing an invoice corresponding to the vehicle with the amount of usage determined and the expected charge to identify any discrepancies. For example, the ALU of the processor 202 can obtain the invoice from the memory 206 via a data bus of the processor 202 and can compare the invoice (or the charges included in the invoice) with the expected charge determined by the ALU, as described above. If the charge in the invoice and the expected charge are different by at least a threshold amount (e.g., a threshold of zero, a threshold of 5% different, a threshold of 10%, a threshold of a current interest rate, etc.), then the ALU of the processor 202 may determine that a discrepancy exists. The discrepancy can relate to differences between chargeable time stated on the invoice and the amount of usage determined by the processor 202 in the statement 302, differences between the expected charge and a charge stated on the invoice, or both. The processor 202 can attempt to reconcile 306 the discrepancy by generating a request for correction based on the discrepancy identified. For example, in response to the ALU of the processor 202 determining that a discrepancy exists, the ALU may send data to the memory 206 and/or to the interface 204 that represents the discrepancy and/or a request to correct the discrepancy. The request may include the difference identified by the processor 202, the invoiced charge, and/or the expected charge.

To accompany the request, the processor 202 (e.g., the ALU) can generate a report evidencing the discrepancy. The report can be extracted from other reports 324, or generated based on the event data 318 stored in the memory 206 (and accessed by the ALU via a data bus of the processor 202). The report, in one example, can provide a timeline of events and an amount of usage time accrued from the timeline based on the set of rules 314. Thus, the report can provide evidence of a miscalculation of usage time. In another example, the report can indicate allowances or exceptions unaccounted for in the invoice, which lead to the discrepancy.

The processor 202 can generate one or more commands 308 in response to receipt of an instruction, from a user 116 for example, and execute the received instruction. The instruction, according to one example, can be a request for a vehicle (e.g., an order in the rail transport example described above). The processor 202 (e.g., the ALU), responsive to receipt of the request for the vehicle (e.g., via the data bus of the processor 202), can generate a signal or message, indicative of the request, as a command 308 to be conveyed to the carrier 114. In another example, the instruction can a release of the vehicle back to the carrier 114 or owner 112. Similar to the vehicle order instruction, the processor 202 can generate a signal or message indicating the release as a command (e.g., a command signal) 308. Additional examples of instructions can include an order to place a vehicle, a relief request, an adjustment request, or instructions providing data to be stored and/or edits to data already stored. For instruction corresponding to events (e.g., vehicle orders, vehicle releases, placement orders, etc.), the processor 202 can generate event information 104 to be appended to event data 318 as a command 308. The ALU of the processor 202 can combine the event information 104 with other event data and store this combined information in the memory 206 via the data bus of the processor 202. In one aspect, the instructions received can be captured via a user interface, which may be web-based, that is generated by the interface 312.

The processor 202 issues notifications 310 to one or more of entities 110. The notifications 310 can represent electronic signals including information on events monitored or tracked 300 by the processor 202 so that the entities 110 can remain apprised on statuses of vehicles. In other aspect, the notification can include information regarding the requests or instructions processed by the commands 308 issued by the processor 202. For instance, the processor 202 can notify 310 a user by communicating the command messages or signals 310 generated by the processor 202, such as by the ALU sending data to the interface 204 via the data bus of the processor 202.

The processor 202 can dispatch the notifications 310 with the communication interface 204 via a variety of communications media. For example, the notifications can be communicated via facsimile, electronic mail, text messages, an API based on HTTP or other remote procedure call protocol, or other electronic data exchange medium. In another aspect, the processor 202 can communicate notifications 310 via interface 312. For instance, notifications 310 can be displayed on the user interface of the computing device 200. The processor 202 can provide data communication via an application-level protocol to generate the interface 312. Accordingly, the interface 312 generated by the processor 202 can include one or more APIs consumed by clients (e.g., applications) executing on computing devices such as personal computers, mobile devices, or servers. Via the APIs, the processor 202 can push the notifications 310 to the clients.

The data store 210 may retain vehicle data 316, user data 320, and/or carrier data 322, which respectively correspond to vehicle information 102, user information 106, and/or carrier information 108 that is input to the demurrage management system 100. While the data enables the processor 202 to operate relative to a plurality of vehicles 202 and interact with a plurality of users and carrier, the data also enables the processor 202 to selectively apply different rules depending on the vehicle, carrier, and/or user.

Figure 4:
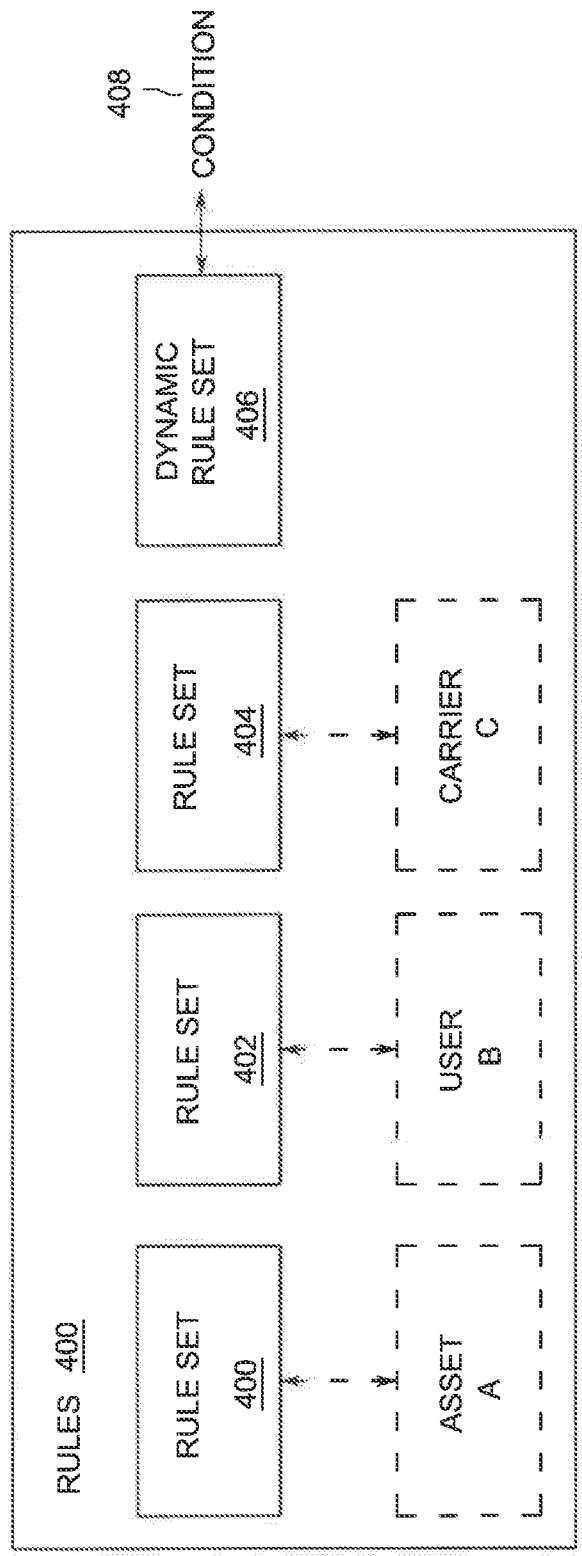
FIG. 4 illustrates a schematic block diagram of one embodiment of various rules utilized by the demurrage management system shown in FIG. 1.

FIG. 4 illustrates a block diagram depicting one aspect of rules utilized within the demurrage management system 100. Rules 314 can include a plurality of sets of rules respectively applicable under varying circumstances. Rule set 400, for instance, can be utilized to determine usage charges associated with a particular vehicle A. Other rules can be associated with specific users, such as rule set 402 and user B, or specific carriers as with rule set 404 and carrier C. For example, for vehicles transported by Carrier C, the demurrage management system 100 can utilize rule set 404 to determine usage charges. In another example, rule set 402 can be used for vehicles used by user B. In situations involving combinations of vehicle A, user B, and carrier C, a union of rule sets 400, 402, and 404 can be generated and employed. The union can be generated by the demurrage management system 100 or curated by entities 110 to produce a resultant rule set including various portions of rule sets 400, 402, and 404, as desired.

For example, when only a single rule set applies for charged incurred for a vehicle, a user, or a carrier, then that single rule set may be used to determine the charges. But, if different sets of rules are associated (e.g., in the memory 206) with different vehicles, users, carriers, etc., and a combination of two or more vehicles, users, and/or carriers is needed to determine the charges, then the different sets of rules may be combined into a combined rule set. The usages and charges associated with the vehicle, user, and/or carrier may then be compared to the rules in the combined rule set to determine the incurred charges.

Rules 314 can also include a dynamic rule set 406 that includes variable rules responsive to a condition 408. For example, the condition 408 can be an availability of a type of vehicle. Accordingly, the dynamic rule set 406 can specify a variable rate dependent on the availability of the type of vehicle. When availability is low, the rate is increased. Likewise, during periods of high availability, the rate can be lowered. Availability can affect other rules beyond just rate. For instance, availability can have a threshold effect that activates certain provisions of the dynamic rule set 406 when availability of a type of vehicle increases or decreases past a predetermined level. One example of a provision that can be activated is an early return credit that extends a reward to users for rapid disposition of a vehicle of a type experiencing high-demand but low availability. Such dynamic provisions can encourage efficient utilization of vehicles.

For example, the different types of vehicles may include rail boxcars, covered rail wagons, refrigerator cars, flatbed rail cars, passenger cars, hopper cars, Schnabel rail cars, gondola cars, mine cars or carts, quarry tub cars, locomotives, or other types of vehicles. Two or more of these types of cars may be charged at different rates (e.g., in terms of the financial amount per unit time or the length of time at which the vehicles may be used for a fixed rate) according to different rules. The rules may change the rates at which different vehicles are charged based on the location of the vehicles, based on how many of the different types of vehicles are available, or other factors. Two or more different users may be charged different rates based on different rules, such as the amount of vehicles used by the different users in a preceding time period (e.g., the previous year), how many other vehicles are currently being used by the users, or other factors. Two or more different shippers or types of cargo also may be associated with different rules that result in different rates being charged to the shippers and/or cargo. Depending on the combination of vehicles, users, cargo, shippers, or the like, a dynamically changing rule set may apply for the combinations to determine how much or what rate to charge for the combination. For example, a first type of vehicle may be charged at a first rate, a second type of vehicle may be charged at a second rate, a first user may be charged a third rate, a second user may be charged a fourth rate, a first type of cargo may be charged at a fifth rate, and a second type of cargo may be charged a sixth rate. The rule set that determines how much to charge for the vehicle, cargo, user, shipper, etc., may dynamically change as one or more factors (e.g., the type of vehicle, shipper, cargo, etc.) change. For example, a combination of the first vehicle being used by the first user to ship a first cargo may be charged a combination (e.g., a sum, product, average, median, or other calculation) of the first rate, the third rate, and the fifth rate. But, if the first user changes the type of vehicle to the second vehicle type, the dynamically changing rule set may cause the first user to be charged a combination of the second rate, the third rate, and the fifth rate. If the first user continues using the second vehicle type to move or store the second type of cargo, then the dynamically changing rule set may cause the first user to be charged a combination of the second rate, the third rate, and the sixth rate. The rule set may continue to dynamically change based on changes in circumstances in other situations in addition to or as an alternate to changes in the user, the type of vehicle, and/or the type of cargo.

Figure 5:
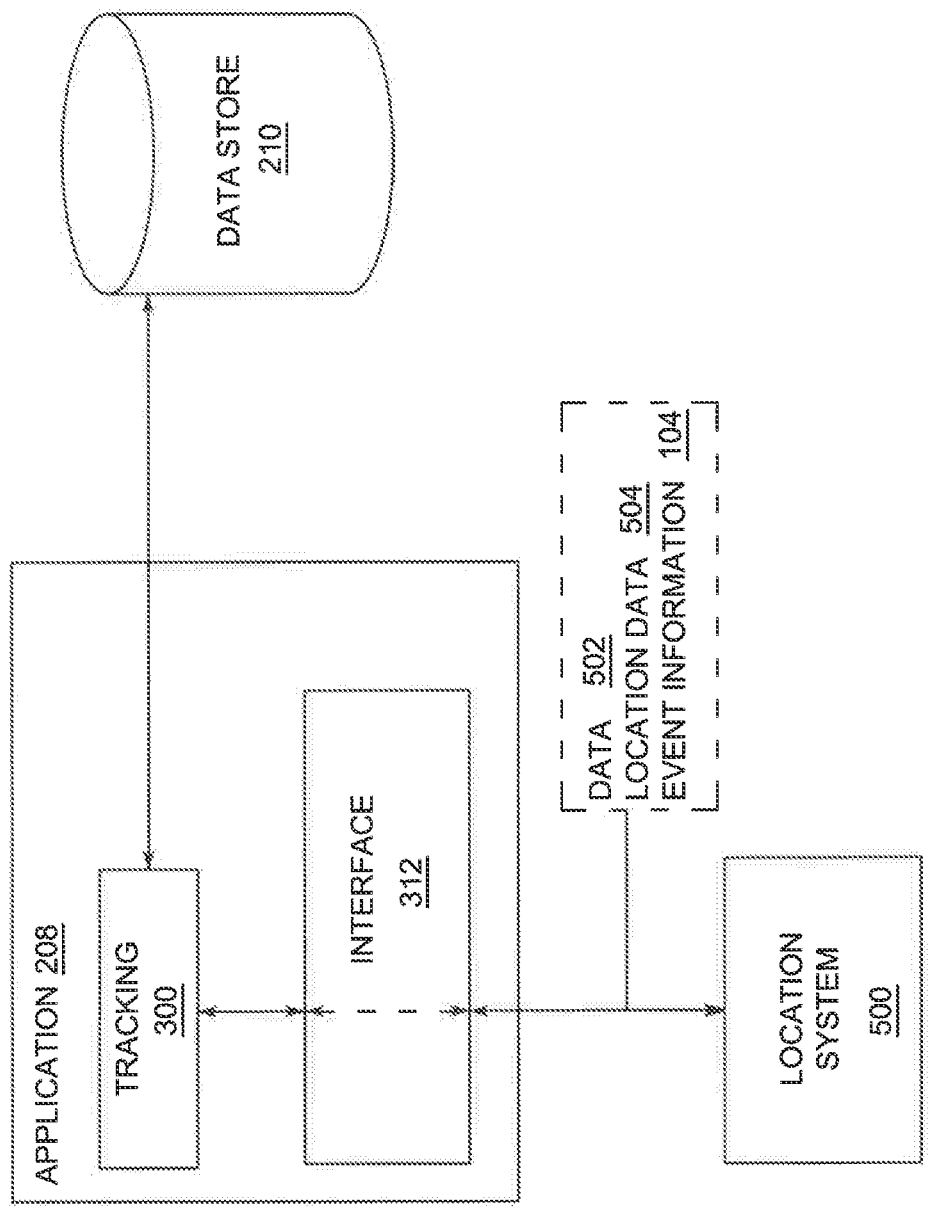
FIG. 5 illustrates a schematic block diagram of one embodiment of the demurrage management system shown in FIG. 1 interacting with a vehicle location system.

FIG. 5 illustrates the processor 202 of the demurrage management system 100 maintaining the dynamic rule set 406 through integration with a vehicle location system 500 ("Location System" in FIG. 5) according to one embodiment. The processor 202 can track 300, via the interface 312 generated by the processor 202, and utilize one or more APIs, access points, or communication protocols associated with the vehicle location system 500 to receive vehicle-related information. For example, the processor 202 can query the vehicle location system 500 for information pertaining to a particular vehicle, for information regarding vehicles associated with a particular carrier or user, and/or information related to a type of vehicle. In another example, the processor 202 can subscribe to a feed or data stream provided by the vehicle location system 500 to receive relevant information. Information obtained from the vehicle location system 500 can include vehicle data 502 that provides information identifying vehicles and specifying properties of the vehicles, location data 504 providing a location of one or more vehicles, and event information 104 associated with the vehicles. In one example, the event information 104 can be provided in the form of Car Location Messages (CLMs) and also referred to as movement data.

The vehicle location system 500 represents hardware circuitry that includes and/or is electrically connected with one or more processors (e.g., microprocessors, field programmable gate arrays, integrated circuits, or other electronic logic-based devices) that obtain, receive, and/or communication the vehicle data 502, location data 504, and/or event information 104. The vehicle location system 500 can receive some or all of this information from users, shippers, and/or owners. With respect to the vehicle data 502, this information can be automatically provided by GPS receivers onboard the vehicles, roadside transponders that record the passage of vehicles, cameras (e.g., at toll booths or other locations), or the like.

Through integration with the vehicle location system 500, the demurrage management system 100 can monitor and record vehicle traffic and usage across several users and carriers. The integration further enables autonomous tracking of exceptions or instances of claimable relief, which can be recorded and automatically factored into estimated charges. Thus, the demurrage management system 100 can efficiently determine demurrage and/or storage charges for vehicles and provide an accurate check to ensure accurate invoicing of vehicle-related costs.

Figure 6:
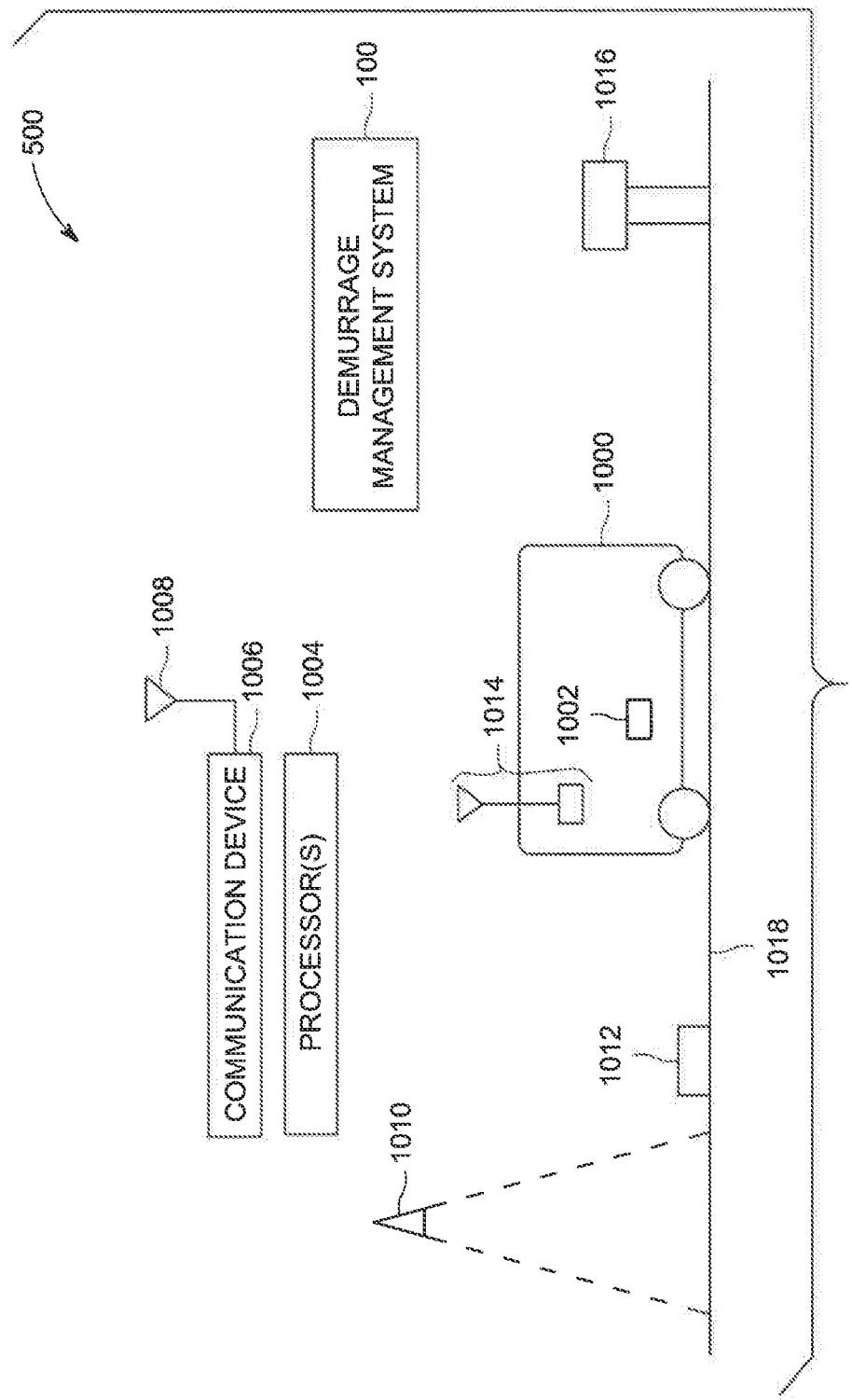
FIG. 6 illustrates one embodiment of the vehicle location system shown in FIG. 5.

FIG. 6 illustrates one embodiment of the vehicle location system 500 shown in FIG. 5. The vehicle location system 500 obtains and provides at least some of the vehicle-related information to the demurrage management system 100. For example, the vehicle location system 500 may determine the vehicle data 502, location data 504, and/or event information 104, and report this information to the demurrage management system 100.

The vehicle location system 500 includes hardware circuitry that includes and/or is electrically connected with one or more processors 1004 (e.g., microprocessors, field programmable gate arrays, integrated circuits, or other electronic logic-based devices) that obtain, receive, and/or communication the vehicle data 502, location data 504, and/or event information 104. The vehicle location system 500 may include a communication device 1006, which can represent transceiving circuitry that communicates with one or more input devices 1010, 1012, 1014, 1016 of the vehicle location system 500 that provide some or all of the vehicle data 502, location data 504, and/or event information 104 to the vehicle location system 500. The communication device 1006 can include an antenna 1008 for wirelessly communicating this information to the demurrage management system 100 via one or more wireless connections, or may be electrically coupled with the demurrage management system 100 for communication this information via one or more wired connections. The input device 1010 can include a sensor (e.g., a camera, photodetector, radar, sonar, etc.), the input device 1012 can include an electromagnetic sensor, the input device 1014 can include a vehicle location device (e.g., a GPS receiver), and the input device 1016 can represent a computer, kiosk, or other device.

In one embodiment, at least some of the event data 318, the vehicle data 502, location data 504, and/or event information 104 may be automatically captured and/or reported to the demurrage management system 100 by the vehicle location system 500. For example, the entry of a vehicle 1000 into a designated area or geo-fence (e.g., a rail yard, parking lot, or other location) along a route 1018 may be automatically determined by one or more of the input devices 1010, 1012, 1014, 1016. The sensor 1010 may automatically detect passage of the vehicle 1000 to determine that the vehicle 1000 has entered into or left the designated area. The electromagnetic sensor 1012 can include a radio frequency identification (RFID) interrogator or tag that communicates with a complementary RFID tag or interrogator 1002 on the vehicle 1000 to detect passage of the vehicle 1000 to determine that the vehicle 1000 has entered into or left the designated area. The input device 1014 can determine the location of the vehicle 1000 and communicate the location to the processors 1004, which can compare the vehicle location to geo-fences or other designated areas to determine when the vehicle 1000 enters or leaves the designated area or geo-fence. The input device 1016 can receive operator-provided input, such as information about where the vehicle 1000 is located, when the vehicle 1000 enters or leaves the designated area, operations performed on the vehicle 1000, or other information. The input device 1016 can then communicate this information to the processors 1004 via one or more wired and/or wireless connections.

Optionally, one or more of the input devices 1010, 1012, 1014, 1016 can obtain data used to determine the identity and/or type of vehicle 1000. For example, a camera can obtain images or video of the vehicle 1000, which is examined by the processors 1004 to determine the vehicle type and/or identity (e.g., by comparing the image or video to stock images or shapes associated with different vehicle types and/or identities). The electromagnetic sensor 1012 can communicate with the complementary tag or interrogator 1002 to obtain the vehicle type and/or identity. The vehicle type and/or identity can be communicated from the vehicle 1000 to the processor 1004, and/or an operator may input the vehicle type and/or identity into the input device 1016.

The information provided by one or more of the input devices 1010, 1012, 1014, 1016 can be automatically communicated to the processors 1004, such as when passage of a vehicle 1000 is determined, when an identity of the vehicle 1000 is determined, etc. The processors 1004 may then automatically communicate the information to the demurrage management system 100, which can be used to determine chargeable usage of the vehicle 1000, as described herein.

In view of the example devices and systems described above, methodologies that can be implemented in accordance with the disclosed inventive subject matter are described with reference to the flow charts of FIGS. 7 and 8. The methodologies are shown and described as a series of blocks; however, the claimed subject matter is not limited by the order of the blocks, as some blocks can occur in different orders and/or concurrently with other blocks. Moreover, not all illustrated blocks may be required to implement the methods described hereinafter. The methodologies can be implemented by the system described above with respect to FIGS. 1 through 5, for example. In one embodiment, the flowcharts illustrative of the methods and described in connection with FIG. 7 and/or 8 may represent one or more algorithms used to program a computer or processor to perform the operations described herein.

The demurrage management system 100 can allow shippers to internally manage the demurrage, storage, and detention records relative to calculations used for unit trains, which are often miscalculated or invoiced by the owners of the unit trains. The demurrage management system 100 can capture events of the vehicles in the unit trains (e.g., event data 318), dynamically determining rules for calculating the usage charges of the vehicles in the unit trains, and adjusting these charges within a short period of time.

Figure 7:
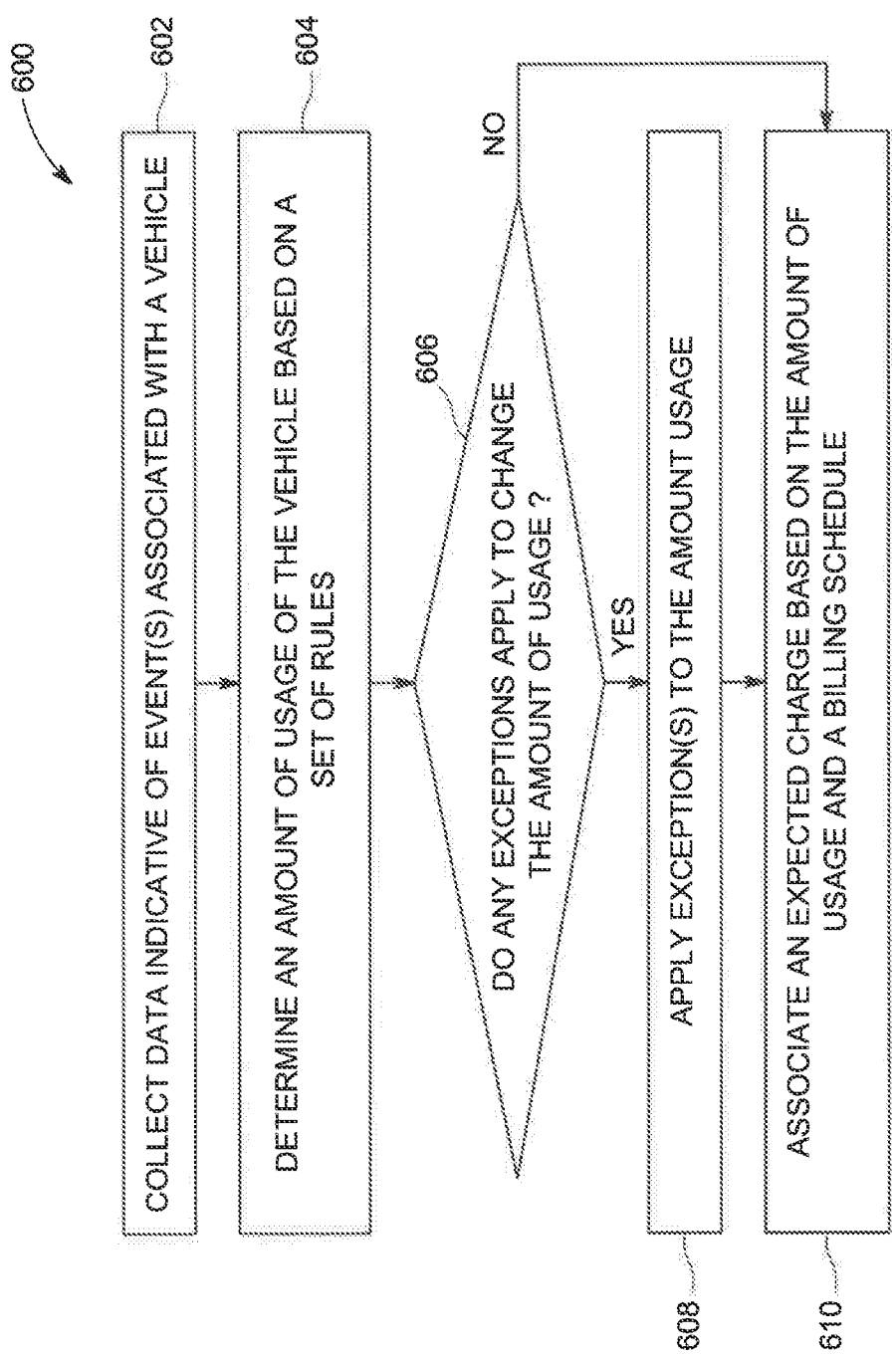
FIG. 7 illustrates a flow diagram of one embodiment of a method for determining an expected charge amount for usage of a vehicle.
Figure 8:
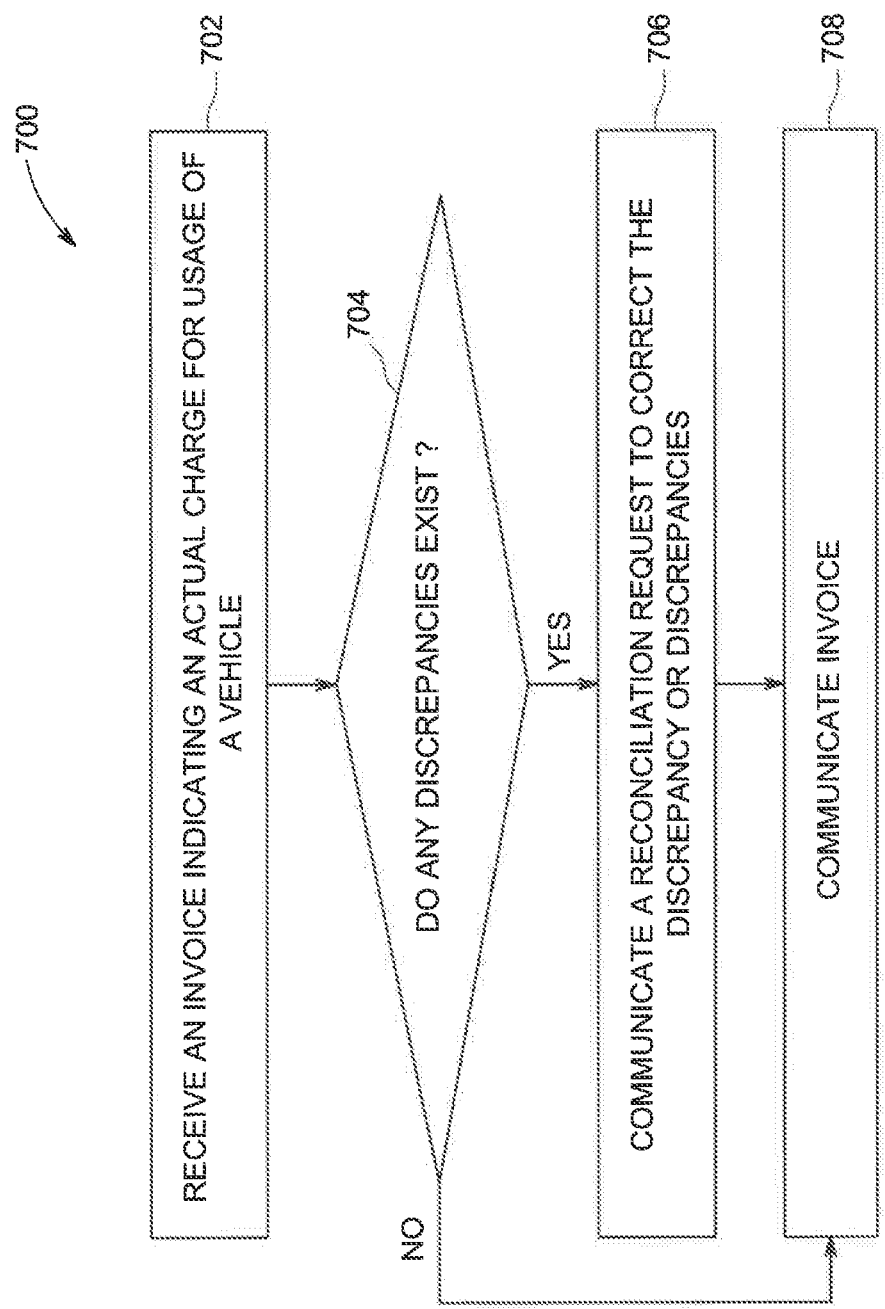
FIG. 8 illustrates a flow diagram of one embodiment of a method for reconciling discrepancies between an expected charge amount and an actual charge.

FIG. 7 illustrates a flow diagram of one embodiment of a method 600 for determining an expected charge amount for usage of a vehicle. The method of FIG. 7 can be performed, for example, by the demurrage management system 100 described above. At 602, data indicative of events associated with a vehicle are collected. The data can be received as input manually provided by users or carriers. In some instance, input from user or carriers (such as but not limited to placement notifications, vehicle orders, placement orders, releases, and forwarding instructions) can be the data that are collected, or such input, when received by the demurrage management system 100, generates the data collected, as event information. Alternatively, the data can be collected through integration with the vehicle location system 500. For instance, the data can be received in the form of Car Location Messages (CLMs) or other movement data corresponding to the vehicle. While vehicle events form one basis for usage charges (e.g., demurrage or storage charges), the data collected can extend beyond event notifications and include other information applicable in estimating charges. The data collected can include information indicating one or more of a vehicle identity, vehicle owner, type of vehicle, availability of a type of vehicle, demand of a type of vehicle, vehicle location, vehicle status, movement of the vehicle, vehicle condition, vehicle properties, vehicle orders or request, vehicle order-by-dates, weather reports, vehicle origin, vehicle destination, and/or substantially any other data, information, or characteristics pertaining to the vehicle.

At 604, an amount of usage of the vehicle is determined based on the data collected and one or more sets of rules. The set(s) of rules can be tariff rules, for example, corresponding to carrier responsible for transporting the vehicle. The set of rules can also include custom or special provisions activated for a particular user of the vehicle, for a particular type of vehicle, or based on other conditions such as vehicle availability, weather, or the like. The set of rules generally establish which events (indicated in the data collected) accrue usage charges, which events suspend accrual, and which events terminate the transportation cycle (e.g., conclude usage and terminate accrual of charges) and/or the charge for usage of the vehicle. In one aspect, one or more of the sets of rules that is used to determine the amount of usage of the vehicle and/or the accrual of charges for the vehicle is a dynamically changing rule set that changes over time and as factors change (e.g., the type of vehicle changes, the type of cargo changes, the demand for the vehicle or vehicle type changes, etc.).

At 606, a determination is made as to whether one or exceptions apply to change the amount of total chargeable usage. The set of rules may provide exceptions, exclusions, grounds for relief, and other provisions that effect an amount of total usage that is chargeable. For example, as indicated in the data collected, a total of five days can lapse between when the vehicle is initially tendered to the user and when the user release the vehicle back to the carrier. The data collected can indicate certain exceptions, however, such as for example incorrect placement of the vehicle or the vehicle being damaged that reduces the amount of chargeable time to three days, for example. The reduction in chargeable usage, in one example, accounts for the time required for the carrier to correct the error by, for example, moving the vehicle to a correct location or replacing the damage vehicle with a functioning vehicle.

If one or more exceptions apply to change the amount of total chargeable usage for a vehicle, then flow of the method 600 may proceed toward 608. Otherwise, if no exceptions apply, then flow of the method 600 may proceed toward 610. At 608, the one or more exceptions are applied to the total chargeable usage. For example, the total chargeable usage of five days in the preceding example can be reduced to three days (or another time period). In another example, one or more of the exceptions can increase the total chargeable usage. For example, if there is high demand and/or low availability for a type of vehicle, then the total chargeable usage for that vehicle type may be increased (e.g., relative to an equivalent usage of another type of vehicle). Flow of the method 600 may then proceed toward 610.

At 610, an expected charge is associated with the amount of usage determined. In one embodiment, the expected charge can be determined based on a billing schedule. The billing schedule, in one example, can be included in the set of rules employed at 604 to determine the amount of usage. In another example, the billing schedule can be provisions that are separate from the rules at 604. For instance, the billing schedule can be associated with a different rule set or may dynamically change, as described above. By way of example, in FIG. 4, a plurality of rules sets can be respectively associated with one or more of vehicles, carriers, and/or users. Moreover, as described above, respective portions of two or more rule sets can be combined to produce an aggregate or combined set of rules utilized by the demurrage management system 100 for a particular carrier-user combination, or a carrier-user-vehicle combination. Accordingly, the set of rules utilized at 604 to determine the amount of usage can be associated with the carrier, whereas the billing schedule used to assign a charge is associated with the user. Thus, as usage involves interactions between the user and the carrier (who in turn can be serving a plurality of users), carrier-specific rules can be applied. When determining a charge for the usage, however, user-specific rules can be applied. Accordingly, the billing schedule used at 606 can be a negotiated instrument between the carrier and the user.

The amount of usage of the vehicle and the expected charge can be employed to verify accuracy of an invoice. FIG. 8 illustrates a flow diagram of one embodiment of a method 700 for reconciling discrepancies on an invoice for usage of the vehicle. The method 700 can be performed by the demurrage management system 100 described herein. At 702, an invoice for usage of the vehicle is received. The invoice indicates an actual charge for the usage of the vehicle according to an entity issuing the invoice (e.g., the carrier). The invoice can be communicated by the issuer to the demurrage management system 100, for example. Alternatively, the invoice can be input by a receiver of the invoice and/or the demurrage management system 100 may generate the invoice. In an aspect, receiving information, electronically or through manual entry, indicative of the actual charge and the charged usage amount may constitute receiving the invoice.

At 704, the actual charge and the charged usage amount are respectively compared to the amount of usage and the expected charge determined based on event data and one or more sets of rules in order to determine whether any discrepancies exist. As described above, in one embodiment, a discrepancy may exist where the invoiced amount for usage of the vehicle differs from the chargeable time determined by the demurrage management system 100. If a discrepancy is identified or discovered, then flow of the method 700 may proceed toward 706 to resolve the discrepancy or discrepancies. If no discrepancy or relatively small discrepancies (e.g., discrepancies in the favor of the user or discrepancies that are smaller than a designated threshold) are discovered, then flow of the method 700 may proceed toward 708.

At 706, a reconciliation request is communicated to correct the discrepancies. For instance, when a discrepancy is identifier, a report is generated that indicates a timeline of events for the asset and an amount of chargeable usage, with exceptions applied, based on the set of the rules. The report provides evidentiary support for the reconciliation request.

At 708, the invoice (without the discrepancies or with small discrepancies) or the corrected invoice (e.g., after removal or correction of the discrepancies) is communicated to the interested parties. For example, the invoice or corrected invoice may be communicated to the owner of the vehicle, the shipper, and/or the user so that the invoice or corrected invoice may be paid.

Various embodiments of a demurrage management system described herein can be implemented in connection with a variety of computing devices, client devices, or server devices, which can be deployed as part of a computer network or in a distributed computing environment, such as the cloud or via cloud computing. The various embodiments described herein can be implemented in a variety of computer systems or computing environment having any number of memory or storage units, any number of processing units, and any number of applications and processes occurring across any number of storage units and processing units. This includes, but is not limited to, cloud environments with physical computing devices (e.g., servers) aggregating computing resources (e.g., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices. The client computing devices can access the computing services or functionality via application program interfaces (APIs), web browsers, or other standalone or networked applications. Accordingly, aspects of the membership-based service can be implemented based on such a cloud environment.

For example, demurrage management system 100 can reside in the cloud environment such that the computer-executable instruction implementing the functionality thereof are executed with the aggregated computing resources provided by the plurality of physical computing devices. The cloud environment provides one or more methods of access to the demurrage management system 100, which can be used by the entities 110 via computing devices, mobile devices, etc. These methods of access include IP addresses, domain names, URIs, etc. Since the aggregated computing resources can be provided by physical computing device remotely located from one another, the cloud environment can include additional devices such as routers, load balancers, switches, etc., that appropriately coordinate network data.

Figure 9:
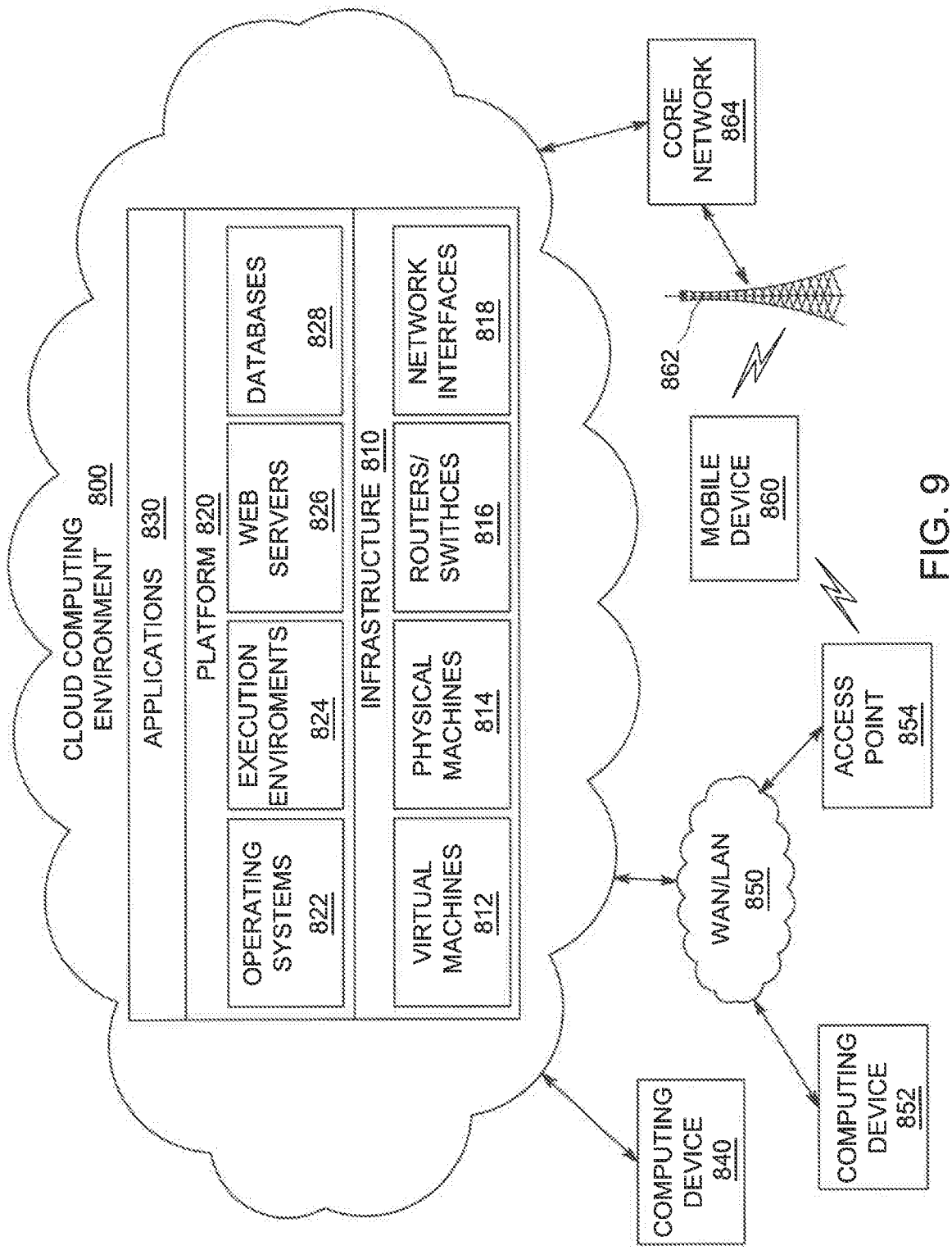
FIG. 9 illustrates a block diagram representing one example of a network environment in which various embodiments of the demurrage management system and/or vehicle location system described herein can be implemented.

FIG. 9 schematically illustrates one example of a networked or distributed computing environment, such as a cloud computing environment 800. The cloud computing environment 800 represents a collection of computing resources available, typically via the Internet, to one or more client devices. The cloud computing environment 800 comprises several levels, including infrastructure 810, a platform 820, and applications 830. Each level, from infrastructure 810 to applications 830 can be implemented on top of lower levels, with infrastructure 810 representing the lowest level.

Infrastructure 810 encompasses the physical resources and components on which cloud services are deployed. For instance, infrastructure 810 can include virtual machines 812, physical machines 814, routers/switches 816, and network interfaces 818. The network interfaces 818 provide access to the cloud computing environment 800, via the Internet or other network, from client devices such as computing devices 840, 852, 860, etc. That is, network interfaces 818 provide an outermost boundary of cloud computing environment 800 and couple the cloud computing environment 800 to other networks, the Internet, and client computing devices. Routers/switches 816 couple the network interfaces 818 to physical machines 814, which are computing devices comprising computer processors, memory, mass storage devices, etc. Hardware of physical machines 814 can be virtualized to provide virtual machines 812. In an aspect, virtual machines 812 can be executed on one or more physical machines 814. That is, one physical machine 814 can include a plurality of virtual machines 812.

Implemented on infrastructure 810, platform 820 includes software that forming a foundation for applications 830. The software forming platform 820 includes operating systems 822, programming or execution environments 824, web servers 826, and databases 828. The software of platform 820 can be installed on virtual machines 812 and/or physical machines 814.

Applications 830 include user-facing software applications, implemented on platform 820, that provide services to various client devices. In this regard, the demurrage management system 100 described herein is an example application 830. As illustrated in FIG. 9, client devices can include computing devices 840, 852 and mobile device 860. Computing devices 840, 852 can be directly coupled to the Internet, and therefore the cloud computing environment 800, or indirectly coupled to the Internet via a WAN/LAN 850. The WAN/LAN 850 can include an access point 854 that enables wireless communications (e.g., WiFi) with mobile device 860. In this regard, via access point 854 and WAN/LAN 850, mobile device 860 can communicate wirelessly with the cloud computing environment 800. Mobile device 860 can also wirelessly communicate according to cellular technology such as, but not limited to, GSM, LTE, WiMAX, HSPA, etc. Accordingly, mobile device 860 can wireless communicate with a base station 862, which is coupled to a core network 864 of a wireless communication provider. The core network 864 includes a gateway to the Internet and, via the Internet, provides a communication path to the cloud computing environment 800.

As mentioned, advantageously, the techniques described herein can be applied to a variety of devices where it is desirable to track vehicle movement and status in order to verify proper usage charges. It can be understood, therefore, that handheld, portable and other computing devices and computing objects of a variety of types are contemplated for use in connection with the various embodiments of a demurrage management system. Accordingly, the below general purpose computer described below in FIG. 10 is but one example of a computing device.

Embodiments of the subject matter described herein can partly or entirely be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those of ordinary skill in the art will appreciate that computer systems have a variety of configurations and protocols that can be used to communicate data, and thus, no particular configuration or protocol is considered limiting.

Figure 10:
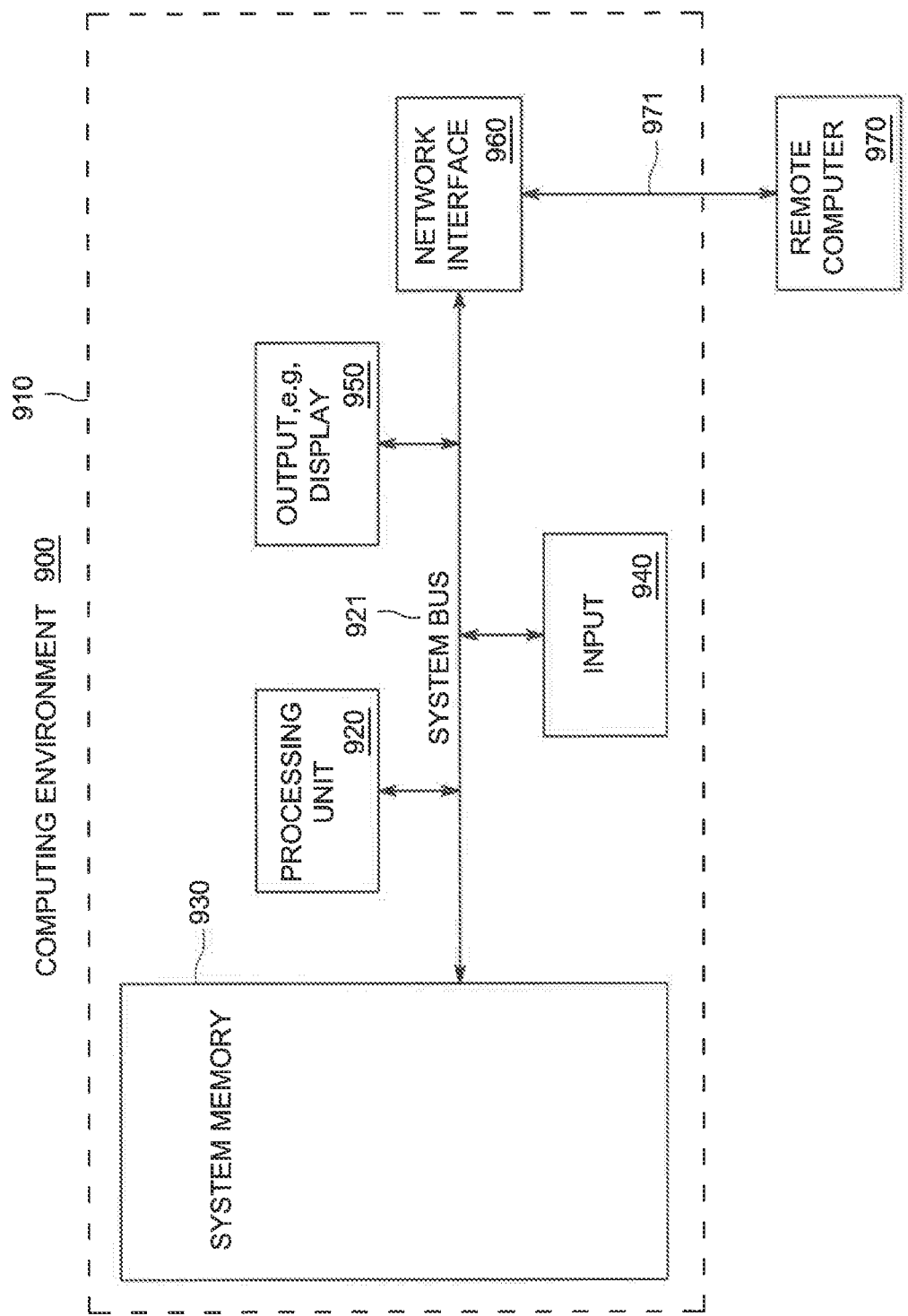
FIG. 10 illustrates a block diagram representing one embodiment of a computing system or operating environment in which one or more embodiments described herein can be implemented.

FIG. 10 illustrates one example of a computing system environment 900 in which one or more embodiments of the demurrage management system described herein can be implemented. The computing system environment 900 represents one example of a suitable computing environment and is not intended to suggest any limitation as to scope of use or functionality. In addition, the computing system environment 900 is not intended to be interpreted as having any dependency relating to any one or combination of components illustrated in the exemplary computing system environment 900.

One example device for implementing one or more embodiments includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data. According to a further example, computer 910 can also include a variety of other media (not shown), which can include, without limitation, RAM, ROM, EEPROM, flash memory or other memory technology, optical disk storage, or other tangible and/or non-transitory media which can be used to store desired information.

A user can enter commands and information into the computer 910 through input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 10 include a network 972, such local area network (LAN) or a wide area network (WAN), but may also include other networks/buses. Such networking environments are commonplace in homes, offices, enterprise-wide computer networks, intranets and the Internet.

As mentioned above, while some embodiments have been described in connection with various computing devices and network architectures, the underlying concepts may be applied to any network system and any computing device or system in which it is desirable to implement a demurrage management system as described herein.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

Various embodiments may utilize tender vehicles. For example, one or more embodiments herein described relate to vehicle control systems, e.g., vehicle management systems, vehicle systems/equipment, and associated methods for coordinating and managing the movement of cargo (goods and/or people) throughout a transportation network using self-propelling tender vehicles and separate, self-propelled cargo vehicles that are powered by energy stored and/or transported by the tender vehicles. The tender vehicle may move in the network to couple with and provide energy, torque, power, functionality and/or information to the cargo vehicles. A suitable tender vehicle may be a driverless vehicle. By driverless, it is meant that an operator may be located offboard and/or may be a controller rather than a person. The cargo vehicles may use electrical energy provided from the tender to power propulsion systems of the cargo vehicles to move the cargo vehicle throughout the network and eventually to destination locations.

In various embodiments described herein, the systems and methods described herein may provide a network of single or dual terrain micro-ton haulage, fully autonomous vehicles that may seamlessly engage and coordinate with other customizable rail vehicle systems and automatic trucking vehicles to help railroads improve the delivery efficiency, certainty, and convenience of moving intermodal goods with little to no disruption to the network via a movement as a service (MaaS). While the description herein focuses on the use of rail-based vehicles and vehicle systems (two or more vehicles traveling together, whether the vehicles are mechanically coupled or separate from each other) and the use of road-based vehicles and vehicle systems (e.g., trucks), the systems may involve combinations of other vehicular modalities (e.g., marine vessels, manned and/or unmanned aircraft, mining vehicles, automobiles, etc.). The tender vehicles may couple with as few as one to three cargo vehicles to power the cargo vehicles, instead of known locomotives that may couple with dozens or hundreds of rail cars to move the rail cars through a rail network.

Figure 11:
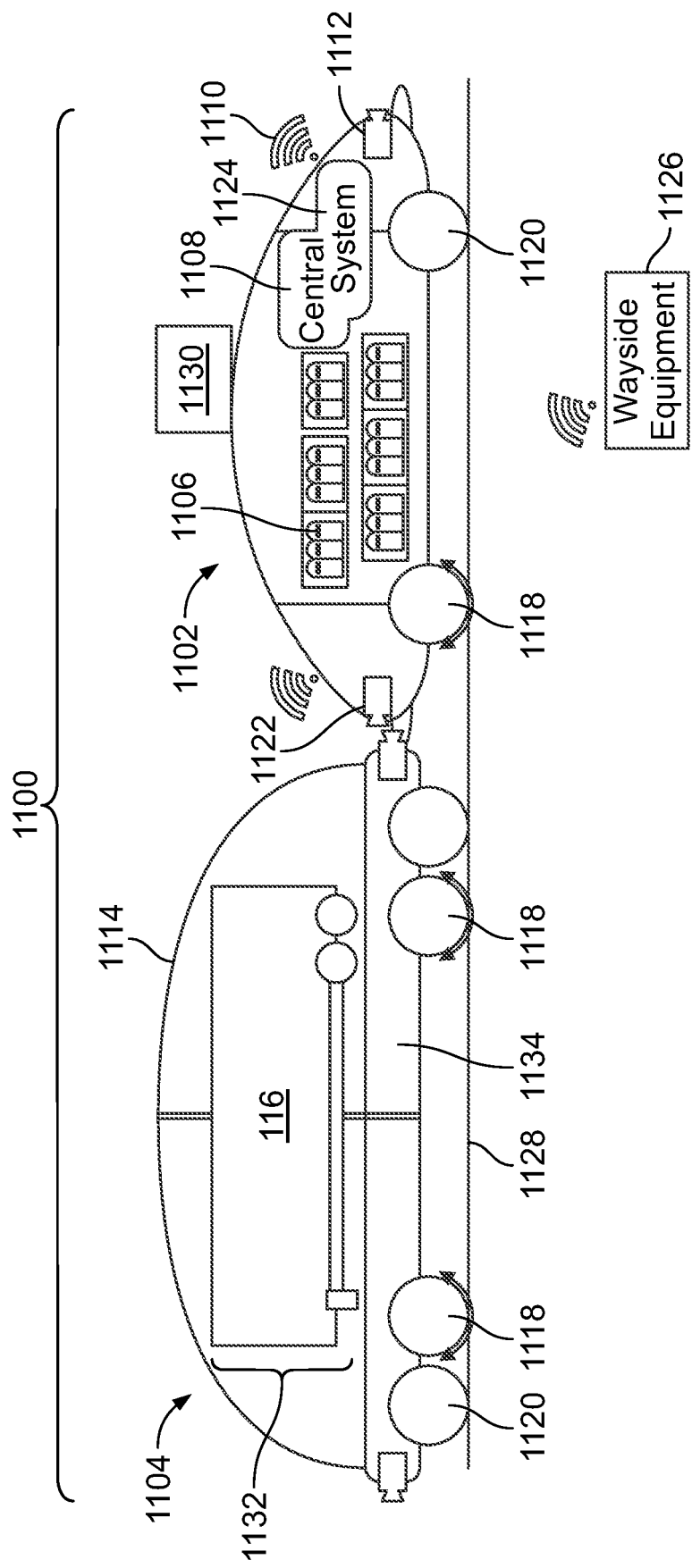
FIG. 11 illustrates one example of a vehicle system.

FIG. 11 illustrates one example of a vehicle system 1100. The vehicle system 1100 includes a tender vehicle 1102 and a cargo vehicle 1104. Alternatively, the vehicle system 1100 may include multiple tender vehicles 1102 and/or multiple cargo vehicles 1104. The tender vehicle 1102 is a self-propelling vehicle that carries one or more power sources 1106, such as one or more onboard energy storage devices. These energy storage devices may be distinct from common vehicle batteries. A common battery may be a lead acid vehicle or marine battery that is sized and configured to turn over an engine starter and possibly provide for a limited amount of auxiliary load energy for a short period of time. But, such a common battery is unable to power a traction motor to propel the vehicle 1102 and/or 1104 or to otherwise continuously provide power to vehicle systems and subsystems. In contrast, an energy storage device may power one or more traction motors for propelling the vehicle 1102 and/or 1104, and/or to supply an auxiliary load for more than bare functionality or for more than a short while. The energy storage devices may be coupled to a dynamic braking system to charge in response to a dynamic braking event using traction motors. Examples of energy storage devices include a lithium ion cell array, a sodium metal halide cell array, a sodium sulfur cell array, a nickel metal hydride cell array, or a nickel cadmium cell array. Optionally, one or more of the power sources 1106 may be fuel tanks, such as containers that hold a liquid and/or gaseous fuel that is consumed by an engine that works to propel the vehicle 1102 and/or 1104. Examples of fuel may include gasoline, diesel fuel, natural gas, compressed air, or the like.

The tender vehicle 1102 may be capable of generating enough tractive effort to self-propel the tender vehicle 1102 along routes 1128 but may not be capable of generating enough tractive effort to move the cargo vehicle 1104 (with or without cargo 1116) along the routes. For example, the tender vehicle 1102 may be a lightweight carrier of the power sources 1106 that is unable to move the cargo vehicle 1104, even with the power sources 1106 being fully charged. That is, the tender vehicle may have enough energy storage capacity to power itself for movement along a route, and to also power the cargo vehicle (as discussed in more detail below), but the engine, motors, etc. of the tender vehicle may lack the tractive effort capacity or rating to move both itself and the cargo vehicle, if the cargo vehicle was dead weight (not self-propelled).

The tender vehicle 1102 includes a vehicle control system 1108 that controls movements of the tender vehicle 1102 and/or the cargo vehicle 1104. The vehicle control system 1108 may represent hardware circuitry that includes and/or is connected with one or more processors (e.g., one or more field programmable gate arrays, one or more microprocessors, one or more integrated circuits, etc.) that control operation of the tender vehicle 1102 and/or the cargo vehicle 1104. The vehicle control system 1108 may automatically control movement of the vehicle 1102 and/or 1104. Alternatively, the vehicle control system 1108 may control movement of the vehicle 1102 and/or 1104 based on input provided by an operator onboard the vehicle 1102. Optionally, the vehicle control system 1108 may control movement of the vehicle 1102 and/or 1104 automatically and also based on input provided by an operator onboard the vehicle 1102 (e.g., by operating in an automatic control mode during some time periods and operating in a manual control mode during other time periods). As another example, the vehicle control system 1108 may control movement of the vehicle 1102 and/or 1104 based on input provided by an operator off-board the vehicles 1102, 1104 (e.g., using a remote control device).

The vehicle control system 1108 optionally includes wireless communication devices 1124 that wirelessly communicate (e.g., via wireless communication signals 1110) with other vehicles 1102, 1104, with an off-board remote control device, with a network management system, with wayside devices, or the like. These devices 1124 may include antennas, modems, transceiving hardware, etc. In one embodiment, the control system 1108 may wirelessly communicate with wayside equipment 1126, such as signals, off-board positive train control (PTC) systems, and the like, so that the control system 1108 is aware of current conditions of routes 1128, locations of other vehicles, moving directions of other vehicles, occupancies of routes 1128, speeds of other vehicles, etc. For example, the control system 1108 may determine whether an upcoming segment of a route 1128 is under repair, is occupied, or is otherwise unavailable for travel by the vehicle 1102 based on signals 1110 received from wayside devices. As another example, the communication device(s) 1124 may communicate with other vehicles 1102 to obtain and/or provide information on the conditions of previous or upcoming portions of the route 1128 (e.g., weather, presence of damage or other vehicles, etc.). The control system 1108 may use this information obtained from wayside equipment 1126, other vehicles 1102, or other off-board locations (e.g., the management system) to determine which routes 1128 and/or portions of routes 1128 may be traveled upon to reach one or more locations within a designated period of time and/or no later than a scheduled time. For example, responsive to receiving at least some of this information, a vehicle 1102 may automatically change which routes 1128 are traveled upon to reach a location to avoid a damaged and/or occupied route 1128.

The vehicles 1102, 1104 may include sensors 1112, 1130 to assist the control system 1108 and/or the operator(s) with controlling movement of the vehicle 1102 and/or 1104. The sensor 1112 may represent one or more coupled sensors 1112 that are onboard the vehicle 1102 and remain onboard the vehicle 1102 during operation of the vehicle 1102 (and may not move relative to the vehicle 1102 during operation of the vehicle 1102). The coupled sensors 1112 may include cameras, radar systems, LiDAR systems, or the like, that output information representing the surroundings of the vehicle 1102. The sensors 1130 may be one or more mobile sensors 1130 capable of moving relative to the vehicle 1102 during operation of the vehicle 1102. For example, the sensor 1130 may be an aircraft (e.g., an unmanned aerial vehicle) carrying a camera, radar system, wind gauge, thermometer, or the like, that may fly ahead of the vehicle 1102 to obtain information on conditions ahead of the vehicle 1102.

The sensor 1130 may include or be connected with a communication device 1124 to wirelessly communicate the information back to the vehicle 1102 (and/or one or more other vehicles). The control system 1108 may examine the information received from the sensors 1112 and/or 1130 to control movement of the vehicle 1102 and/or the vehicle 1104. For example, the control system 1108 may use the information received from the sensors 1112, 1130 to ensure that the vehicles 1102, 1104 maintain a safe distance (e.g., at least a braking distance) from other vehicles or objects, that the vehicles 1102, 1104 travel around obstructions or otherwise avoid collisions with other objects, that the vehicles 1102, 1104 travel along healthy and/or unoccupied routes, that the vehicles 1102, 1104 avoid traveling through adverse weather conditions, that the vehicles 1102, 1104 avoid traveling through congested areas or portions of the route 1128, etc.

One or more of the sensors 1112, 1130 may sense characteristics of the cargo 1116 being loaded onto the vehicle 1104. For example, the sensors 1112, 1130 may include a camera that obtains an image of the cargo 1116 or a label on the cargo 1116, a radio frequency identification (RFID) scanner that interrogates an RFID tag on the cargo 1116, a receiver that wirelessly receives a signal 1110 emitted by a beacon or transmitter associated with the cargo 1116, or the like. The characteristics of the cargo 1116 may include alpha- and/or numeric-text strings, data signals, or other information that identifies the cargo 1116, where the cargo 1116 is to be transported, when the cargo 1116 is to be transported (e.g., a scheduled delivery date and/or time), etc. The control system 1108 may obtain this information from the sensors 1112, 1130 to determine how to deliver the cargo 1116. For example, the control system 1108 may determine routes 1128 to travel upon, where and/or how far the vehicle 1102 is to remain connected with the vehicle 1104 to power the vehicle 1104 to deliver the cargo 1116, and the like, based on the cargo information. The control system 1108 may then control movement of the vehicles 1102, 1104 according to these determinations to get the cargo 1116 to the delivery location within the specified time.

In one embodiment, the tender vehicle 1102 is a vehicle that is smaller (than known freight locomotives), more aerodynamic (than known freight locomotives), fully electric powered, self-propelling, and (optionally) fully automatic vehicle that may propel itself along a route (e.g., railroad tracks). The tender vehicle 1102 may be a rail vehicle having onboard systems that are needed for the vehicle to intelligently move along rails once a request signal is received (e.g., from a management system described herein). These onboard systems may include one or more cooling systems, braking systems, traction systems (e.g., traction motors), power electronics (e.g., circuitry that controls conduction of current from the power sources 1106 to the systems powered by the stored electric energy), communication systems (e.g., transceivers, transmitters, receivers, antennas, modems, etc., of the control system 1108), the power sources 1106, edge processing hardware circuitry (e.g., which may be part of the control system 1108), sensing hardware circuitry (e.g., the sensors 1112), cargo vehicle/platform interaction (e.g., the couplers 1122), and the like.

The tender vehicle 1102 may be smaller and less powerful than currently known locomotives. For example, the motors of the tender vehicle 1102 may be limited to providing much less than the 4,500 horsepower than some known locomotives currently may produce. The motors of the tender vehicle 1102 may not be capable of producing enough horsepower to propel cargo, such as cargo weighing 10,000 pounds or more.

The control system 1108 of the tender vehicle 1102 may monitor operations of the vehicle 1102 and/or the vehicle 1104 to determine when maintenance or inspection of the vehicle 1102 and/or 1104 is needed. For example, the sensors 1112 may include thermocouples, infrared sensors, accelerometers, pressure sensors, ammeters, or other sensors, that monitor temperatures, pressures, vibrations, states of charge, magnitudes of electric current being conducted, and the like, and may determine whether operation of one or more systems onboard the vehicle 1102 and/or the vehicle 1104 is declining or otherwise indicates that repair or inspection is needed. The control system 1108 may then automatically control the vehicle 1102 and/or 1104 to move to a location where the repair or inspection occurs, may send a signal 1110 to a second vehicle 1102 to replace or assist the vehicle 1102 needing inspection or repair, may send a signal 1110 to a third vehicle 1102 to bring another vehicle 1104 to replace or assist the vehicle 1104 in carrying the cargo 1116 to a location, or the like.

The cargo vehicle 1104 includes a platform 1134 and optionally an enclosure 1114 in which cargo 1116 is carried. In the illustrated embodiment, the cargo 1116 is a storage container, such as a trailer in which materials, product, livestock, etc., is carried. Optionally, the cargo 1116 may represent persons, such as a car having seats for people to sit in during travel. As shown, the exterior surfaces of the tender vehicle 1102 and the enclosure 1114 may have rounded shapes that reduce wind resistance relative to other less rounded shapes. This may allow the vehicles 1102, 1104 to reduce electricity and/or fuel consumption during travel. Optionally, the tender vehicle 1102 may carry at least some of the cargo 1116. In one embodiment, the tender vehicle 1102 does not carry any of the cargo 1116.

The vehicles 1102, 1104 may include propulsion systems 1118. In one embodiment, a propulsion system 1118 may represent a powered wheel-axle set and one or more traction motors. The wheel-axle set includes an axle that connects two wheels with the axle being rotated by the traction motor(s) to rotate the wheels (and thereby propel the vehicle 1102 and/or 1104). Optionally, the propulsion system 1118 may represent the one or more traction motors and a wheel (or set of wheels) that are rotated by the traction motor(s) to propel the vehicle 1102 and/or 1104. The traction motors may be powered by the electric energy stored in the power sources 1106. Alternatively, the traction motors may be powered by an alternator or generator that is rotated by an engine that consumes fuel from the power sources 1106. In the illustrated embodiment, the cargo vehicle 1104 has two or more powered axles and the tender vehicle 1102 has fewer (e.g., one) powered axle.

The vehicle 1102 and/or the vehicle 1104 optionally may include one or more unpowered axles 1120. An unpowered axle 1120 may represent an axle that is not rotated by a traction motor connected with the axle by one or more gears and/or a wheel that is not rotated by a traction motor connected with the wheel by one or more gears. The unpowered axles 1120 may only rotate due to movement of the vehicles 1102, 1104 caused by rotation of the powered axle(s) 1118. In one embodiment, both the vehicle 1102 and the vehicle 1104 each include at least one propulsion system 1118. In another embodiment, the vehicle 1102 includes at least one propulsion system 1118 but the vehicle 1104 does not include any powered axles.

In the illustrated embodiment, the cargo vehicle 1104 includes more powered axles than the tender vehicle 1102. As a result, the cargo vehicle 1104 may be able to generate more tractive effort or propulsive force to propel the cargo vehicle 1104 (and/or a vehicle system 1100 that includes the vehicle 1104) than the tender vehicle 1102. The greater number of powered axles may be provided in the cargo vehicle 1104 instead of the tender vehicle 1102 because the load (e.g., weight or mass) carried by the cargo vehicle 1104 may be substantially greater than the load carried by the tender vehicle 1102. This increased load may increase the tractive effort generated by the powered axles in the cargo vehicle 1104. Stated differently, the tender vehicle 1102 may be substantially lighter than the cargo vehicle 1104 and, as a result, not generate as much tractive effort or propulsive force as the cargo vehicle 1104.

The vehicles 1102, 1104 may be connected with each other by a powered coupler 1122. This coupler 1122 is or includes a conductive connection between the power sources 1106 in the tender vehicle 1102 and the powered axles (that is, the motors represented by the powered axles) in the cargo vehicle 1104. In this way, the tender vehicle 1102 provides the electric energy consumed by the powered axles in the cargo vehicle 1104 for the cargo vehicle 1104 to propel itself along routes. The coupler 1122 may include cables, wires, buses, or the like, for conductively coupling the power sources 1106 on the tender vehicle 1102 with the powered axles of the cargo vehicle 1104. Optionally, the coupler 1122 may mechanically couple the vehicles 1102, 1104 with each other so that propulsion generated by the cargo vehicle 1104 may push or pull the tender vehicle 1102 along the routes.

The coupler 1122 may include one or more conductive connections that allow for the control system 1108 of the tender vehicle 1102 to communicate with one or more sensors 1112, 1130 onboard the cargo vehicle 1104. Optionally, the cargo vehicle 1104 may alternatively or additionally include a communication device 1124 that wirelessly communicates with the control system 1108 of the tender vehicle 1102; in one embodiment, the two vehicles 1102, 1104 are configured to communicate with one another by way of both wired and wireless connections. Optionally, the cargo vehicle 1104 may include a tangible and non-transitory computer-readable media, such as a computer memory, that stores historical information about the cargo vehicle 1104. The information obtained by the sensors 1112, 1130 and/or stored in the memory of the cargo vehicle 1104 may be communicated to the control system 1108 of the tender vehicle 1102 upon coupling of the vehicles 1102, 1104 to each other. This information may be used by the control system 1108 to determine how to move the vehicle 1104. For example, information about historical usage, maintenance, and/or repairs of the cargo vehicle 1104 may be used by the control system 1108 to determine how quickly to move the cargo vehicle 1104, how much energy to supply to the cargo vehicle 1104, how far the cargo vehicle 1104 may travel (e.g., before repair or maintenance is needed), or the like.

One or more of the sensors 1112 and/or 1130 also may be disposed onboard the cargo vehicle 1104 to provide the control system 1108 of the tender vehicle 1102 with information about the surroundings and/or locations ahead of the vehicles 1102, 1104. As described above, this information may be used by the control system 1108 to dictate how and/or where the vehicles 1102, 1104 move to transport the cargo 1116.

In one embodiment, the vehicle 1102 and/or the vehicle 1104 may be a multi-terrain vehicle capable of moving over different types of routes 1128. For example, the vehicles 1102, 1104 may include two or more sets of wheels connected to axles and/or 120, with one set of wheels shaped and positioned to travel on rails of a track as the route 1128, another set of wheels shaped and positioned to travel on a road as the route 1128, and/or another set of wheels shaped and positioned to travel on another surface (the ground but not on a paved road). The vehicle 1102 (and, optionally, the vehicle(s) 1104) may pull off of rails or track and travel on roads to a destination or other location. Optionally, the vehicle 1102 and/or the vehicle 1104 may have a marine propulsion system and may be able to float on water, with the marine propulsion system propelling the vehicle 1102 and/or the vehicle 1104. The multi-terrain type of vehicle 1102 and/or 1104 may allow for the vehicles 1102, 1104 to complete the last portion of delivery of cargo (e.g., the last-mile of delivery of cargo 1116). For example, the vehicle 1104 may be part of a train traveling along a track that stops at an intersection between the track and a road. The vehicle 1104 may be decoupled from the train and couples with the vehicle 1102 for travel along the road to a destination location of the cargo 1116.

The cargo vehicle 1104 may not include any power sources 1106 onboard the cargo vehicle 1104. The cargo vehicle 1104 may rely on current from the power sources 1106 to power the powered axles of the cargo vehicle 1104. In such an embodiment, the cargo vehicle 1104 may be incapable of propelling itself without being coupled with an external (e.g., off-board) power source, such as the tender vehicle 1102. Alternatively, the cargo vehicle 1104 may include one or more onboard power sources 1106 to at least partially power the motors of the powered axles. These onboard power sources 1106 of the cargo vehicle 1104 may not be capable of storing enough energy to power the axles of the cargo vehicle 1104 to reach a destination of the cargo 1116, but may store enough energy to power the axles to move the cargo vehicle 1104 short distances, such as one hundred meters or less, to position the cargo vehicle 1104 for loading of cargo 1116, unloading of cargo 1116, coupling with the vehicle 1102, or the like.

The cargo vehicle 1104 may be connected with a vehicle other than the tender vehicle 1102. This other type of vehicle may supply power to propel the cargo vehicle 1104. This other type of vehicle may be a vehicle that is propelled (and that pushes or pulls the cargo vehicle 1104) using fuel such as gasoline, diesel fuel, liquid natural gas, or the like.

In one embodiment, the cargo vehicle 1104 may be capable of conveying at least one vehicle 1132 (e.g., a rail car, freight car, trailer, etc.) carrying one or more containers of cargo 1116. For example, the cargo 1116 shown in FIG. 11 may be disposed onboard a trailer pulled by a truck, onboard a rail car, or the like. The vehicle 1132 may be transferred onto the cargo vehicle 1104 by a truck, locomotive, crane, or the like. Optionally, the cargo vehicle 1104 may include an onboard motorized lift, crane, or other equipment to automatically place the container of cargo 1116 (e.g., the vehicle 1132 or another container) onto and/or off the cargo vehicle 1104.

Figure 12:
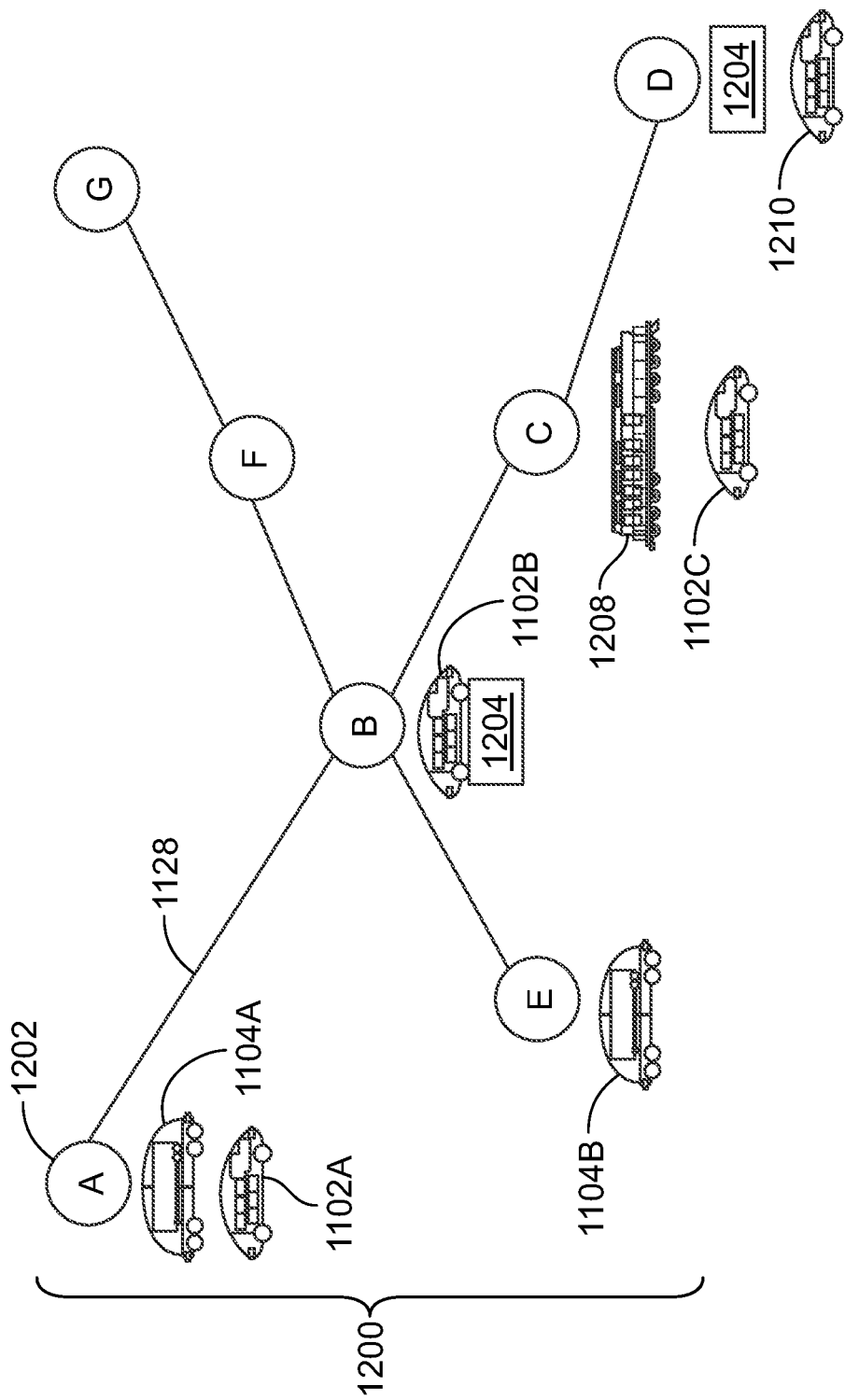
FIG. 12 illustrates one example of a transportation network.

FIG. 12 illustrates one example of a transportation network 1200. The network 1200 is formed by several of the routes 1128 that connect or intersect with each other at various locations 1202 (e.g., locations A-G in FIG. 12). The locations 1202 may represent vehicle yards, rail sidings, route intersections, garages, or the like.

Figure 13:
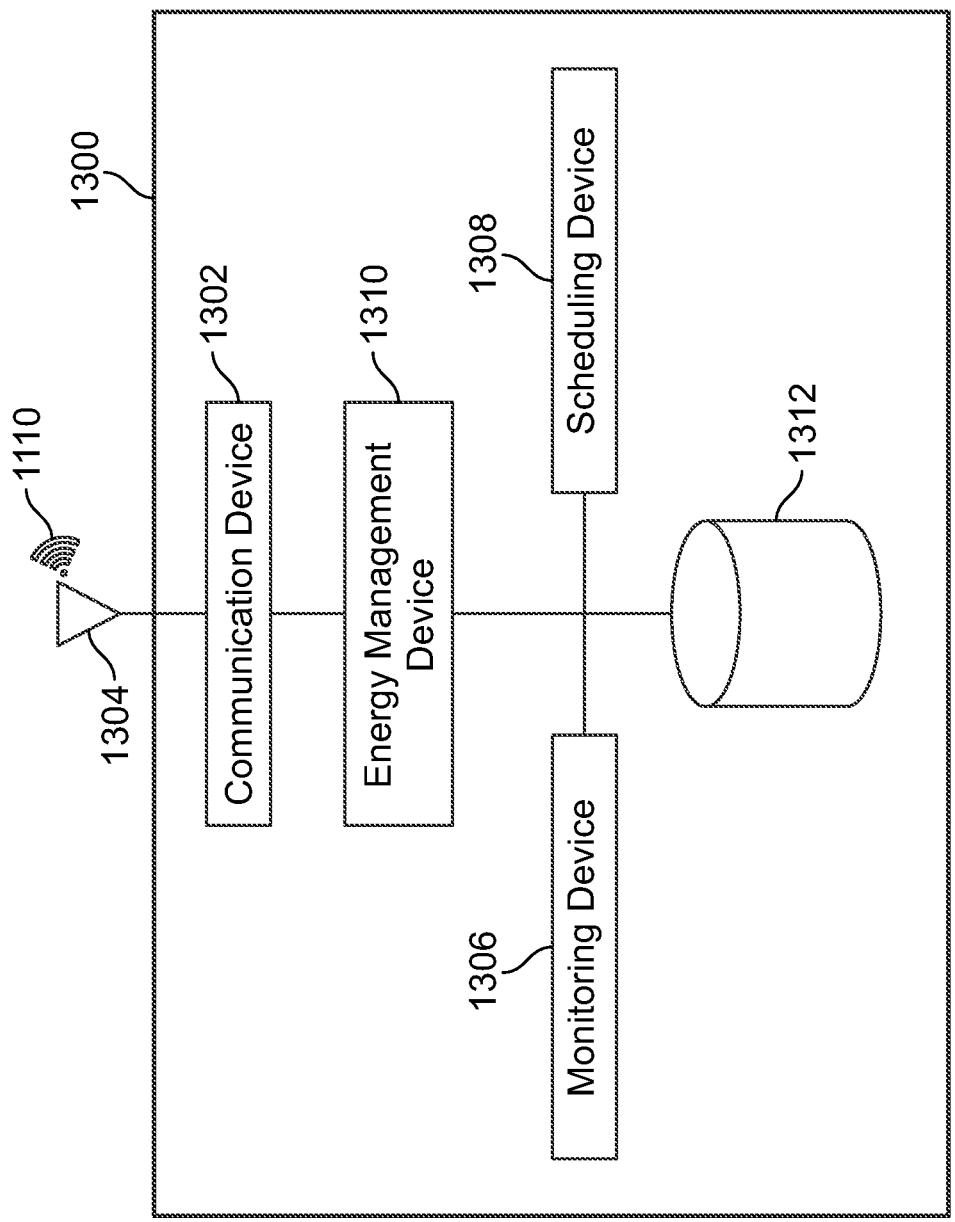
FIG. 13 illustrates one embodiment of a transportation network management system.

With continued reference to the transportation network 1200 shown in FIG. 12, FIG. 13 illustrates one embodiment of a transportation network management system 1300. The management system 1300 represents one or more computerized devices that perform the operations described herein. In one embodiment, the management system 1300 is disposed off-board the vehicles 1102, 1104 and communicates with the vehicles 1102, 1104 as described herein. Optionally, part or all of the management system 1300 is disposed onboard at least one of the vehicles 1102 (e.g., as the control system 1108).

The management system 1300 includes several devices that perform the operations described in connection with each device. The devices may represent hardware circuitry that includes and/or is connected with one or more processors (e.g., one or more microprocessors, one or more field programmable gate arrays, one or more integrated circuits, or the like). The circuitry and/or processor(s) for each device may be separate from each other, or two or more devices may share the same circuitry and/or at least one processor to perform the operations performed by the devices. A communication device 302 may include one or more antennas 304, modems, transceiving hardware, etc., for wirelessly communicating with the vehicles 1102, 1104.

A monitoring device 1306 determines current and/or historical locations of the vehicles 1102, 1104, the cargo 1116, and states-of-charge of the power sources 1106. This information may be communicated by the control systems 1108 of the vehicles 1102 on a periodic, aperiodic, or on-demand basis. Optionally, at least some of this information may be input by an operator of the system 1300. The monitoring device 1306 may store some or all of this information in a tangible and non-transitory computer readable medium, such as a computer memory 1312.

A scheduling device 1308 determines which cargo 1116 needs to be delivered, where the cargo 1116 needs to be delivered, and when the cargo 1116 needs to be delivered. The scheduling device 1308 may obtain this information from the control systems 1108 and/or sensors 1112, 1130 (e.g., by way of the control systems 1108), from manifests associated with the cargo 1116, and/or from manual input by an operator of the system 1300.

In one embodiment, the scheduling device 1308 communicates with computing devices of users to receive requests for vehicles 1102. For example, users of mobile phones, tablet computers, or other computers may submit a request for one or more vehicles 1102 to travel to a location, couple with a vehicle 1104 or a vehicle system 1100 (potentially already having a vehicle 1102), and travel with the vehicle 1104 or vehicle system 1100 to provide additional power to the vehicle 1104 or vehicle system 1100. Users may submit requests via signals 1110 to the scheduling device 1308 to receive vehicles 1102 on demand. The requests may identify the location of the vehicle 1104 or vehicle system 1100 where the vehicle 1102 is requested to join, the distance or location to which the requested vehicle 1102 is to travel with the vehicle 1104 or vehicle system 1100, the routes 1128 to be traveled over, and the like. This information may be communicated to the energy management device 1310 to determine which vehicle 1102 to send.

An energy management device 1310 examines the information obtained or otherwise determined by the monitoring device 1306 and the scheduling device 1308 to determine what cargo 1116 should be carried by which vehicles 1104, which vehicles 1102 should couple with the different vehicles 1104 to form vehicle systems 1100, which routes 1128 that the vehicle systems 1100 are to travel along, how far the vehicles 1102 are to stay coupled with the vehicles 1104, where the vehicles 1102 are to swap out of the vehicle systems 1100 for other vehicles 1102, where the vehicles 1102 are to re-charge the power sources 1106, and the like. The energy management device 1310 may select the tender vehicle 1102 to include in the various vehicle systems 1100 by communicating control signals 1110 to the vehicle control systems 1108. These control signals 1110 may direct the tender vehicle 1102 to automatically move to locations where the tender vehicle 1102 may couple with cargo vehicles 1104 to form vehicle systems 1100. Optionally, the control signals 1110 may cause the vehicle control systems 1108 to present instructions to operators of the tender vehicle 1102 on where to move the tender vehicle 1102 to join with the cargo vehicles 1104 in the vehicle systems 1100.

The energy management device 1310 may determine the tractive effort needed to move cargo 1116 along routes 1128 between various locations 1202A-G in the transportation network 1200 to get the cargo 1116 to the scheduled locations by the scheduled delivery times. The energy management device 1310 may determine what tender vehicle 1102 are available in the transportation network 1200, where the available tender vehicle 1102 are located within the transportation network 1200, what other propulsion-generating vehicles are available (and where) in the transportation network 1200, and/or a state of charge of the power sources 1106 onboard the tender vehicle 1102. Based on this information, the energy management device 1310 may determine which tender vehicle 1102 are to power the cargo vehicles 1104, whether any propulsion-generating vehicles 1208 (e.g., locomotives, trucks, automobiles, aircraft, or the like) other than the tender vehicle 1102 are to help move the cargo vehicles 1104, which stretches or portions of the routes 1128 that the different tender vehicle 1102 are to power the cargo vehicles 1104, and/or which stretches or portions of the routes 1128 that the other vehicles 208 are to push or pull the cargo vehicles 1104.

For example, the energy management device 1310 may determine that a first tender vehicle 1102A is to connect with and power the axles of a cargo vehicle 1104A from a starting location 1202A to a first intermediate location 1202C between the starting location 1202A and a destination location 1202D. The energy management device 1310 may determine that a second tender vehicle 1102B at a second location 1202B is to couple with the cargo vehicle 1104A and the first tender vehicle 1102A to provide additional power to the vehicle system 1100 formed from the vehicles 1102A, 1102B, 1104A. This additional power may be used to power the axles of the cargo vehicle 1104A and/or to charge power sources 1106 of the first tender vehicle 1102A.

For example, during movement from the location 1202B to the location 1202C and/or the location 1202D, the power sources 1106 onboard the second tender vehicle 1102B may recharge one or more of the power sources 1106 onboard the first tender vehicle 1102A while also powering the axles of the cargo vehicle 1104A. Optionally, the second tender vehicle 1102B may couple with the cargo vehicle 1104A and the first tender vehicle 1102A to receive power from the first tender vehicle 1102A to charge one or more power sources 1106 of the second tender vehicle 1102B during movement from the location 1202B to the location 1202C and/or 1202D.

The energy management device 1310 may determine that the first tender vehicle 1102A and/or the second tender vehicle 1102B are to separate from the vehicle system 1100 at a third location 1202C while a propulsion-generating vehicle 1208 (e.g., a locomotive) couples with the cargo vehicle 1104A (and optionally the second tender vehicle 1102B) to propel (e.g., push or pull) the cargo vehicle 1104A to the destination location 1202D. The energy management device 1310 may determine additional changes of the tender vehicle 1102 and/or other vehicles 1208 to join the vehicle system 1100 to move the cargo 1116 toward the destination location at or before the scheduled arrival time. For example, a variety of different combinations of various vehicles 1102, 1208 may be used to push, pull, or provide power to the cargo vehicles 1104 along trips of the cargo vehicles 1104.

The energy management device 1310 may determine which tender vehicle 1102 (and/or other vehicles 1208) are to couple and move with the cargo vehicles 1104 at various locations 1202 and/or times during a trip of the cargo vehicle 1104 based on states of charge of the tender vehicle 1102. In one embodiment, the state of charge of a tender vehicle 1102 is the amount of electric energy stored in the power sources 1106 of the tender vehicle 1102. For example, a tender vehicle 1102 having a full state of charge may have more energy stored onboard the tender vehicle 1102 than when the tender vehicle 1102 has half of a state of charge. The energy management device 1310 may examine the locations of the tender vehicle 1102 and the current states of charge of the tender vehicle 1102 to determine which of the tender vehicle 1102 have enough stored energy to power a cargo vehicle 1104 over at least part of a trip. Optionally, the state of charge may be an amount of fuel onboard the tender vehicle 1102. For example, while the description focuses on a state of charge being monitored, alternatively, the amount of fuel remaining onboard a tender vehicle 1102 may be monitored.

The energy management device 1310 may strategically change out a tender vehicle 1102 having a significant amount of stored energy from a vehicle system 1100 at a mid-way location during a trip. Similar to the example described above, upon arrival of a first vehicle system 1100 at an intermediate location 1202B of a trip (between a starting location 1202A and a destination location 1202D of the trip), a first tender vehicle 1102A may have enough remaining stored energy to continue powering a first cargo vehicle 1104A in the first vehicle system 1100 to a further location 1202C in the trip or the destination location 1202D of the trip. But, the energy management device 1310 may direct the first tender vehicle 1102A to be decoupled from the first cargo vehicle 1104A and removed from the first vehicle system 1100 at the intermediate location 1202B. Optionally, the energy management device 1310 may direct a second tender vehicle 1102B to couple with the first cargo vehicle 1104 in the first vehicle system 1100 at this intermediate location 1202B and provide power to the first cargo vehicle 1104A toward or to the destination location. The first tender vehicle 1102A may then fully or at least partially recharge at the intermediate location 202B before coupling with a second cargo vehicle 1104B in a second vehicle system 1100.

For example, a charging station 1204 may be located at the intermediate location 1202B. This charging station 1204 may include energy storage devices (e.g., batteries), a connection to an electric utility grid, a connection to another power source (e.g., solar panels, turbine engines, wind turbines, or the like), etc. The power sources 1106 onboard the first tender vehicle 1102A may connect with the charging station 1204 (e.g., using cables) to charge the power sources 1106 of the first tender vehicle 1102A.

This second vehicle system 1100 may be moving a second cargo vehicle 1104B from another location 1202E to the location 1202F or 1202G through the location 1202B. The first tender vehicle 1102A may couple with the second cargo vehicle 1104B at the location 1202B and move with the second cargo vehicle 1104B to power the axles of the second cargo vehicle 1104B to the location 1202F and/or the location 1202G. Optionally, the energy management device 1310 may direct the first tender vehicle 1102A to couple with the second cargo vehicle 1104B at the location 1202B and proceed as the second vehicle system 1100 without recharging the first tender vehicle 1102A or without fully recharging the first tender vehicle 1102A at the location 1202B.

The energy management device 1310 selects which tender vehicle 1102 to include in various vehicle systems 1100 during different trips of cargo vehicles 1104 and/or during legs (e.g., portions) of different trips to ensure that the cargo 1116 is delivered at a delivery (e.g., destination) location within a designated or pre-selected time slot. This time slot may be a length of time such as a few minutes (e.g., fifteen minutes), hours (e.g., between one and 4 pm), a date, or the like, that the shipper of the cargo 1116 has agreed to deliver the cargo 1116 and/or that a recipient of the cargo 1116 expects to receive the cargo 1116 at a destination location. This time slot may be set or selected before departure of the cargo vehicle 1104 with the cargo 1116 from a starting or origination location of a trip.

The energy management device 1310 may select the tender vehicle 1102 to provide power to a cargo vehicle 1104, select the locations where the tender vehicle 1102 couple with and/or hand off the cargo vehicle 1104, and the like, so that the cargo 1116 is delivered within the designated time slot, and not before or after the time slot. This may help ensure that portions of the transportation network 1200 are not overly congested with vehicle systems 1100 delivering cargo 1116 too early or too late.

For example, the energy management device 1310 may select tender vehicle 1102 that are not fully charged to couple with a cargo vehicle 1104 responsive to the cargo vehicle 1104 being ahead of schedule. The energy management device 1310 may direct the cargo vehicle 1104A to remain at the location 1202B with a partially charged tender vehicle 1102B while the power sources 1106 onboard the partially charged tender vehicle 1102B fully or at least partially re-charge. The energy management device 1310 may direct the cargo vehicle 1104A to remain in this holding pattern even if the additional charge is not needed for the tender vehicle 1102B to power the cargo vehicle 1104A over the remainder of the trip from the location 1202A to the location 1202D via the location 1202B. As another example, the energy management device 1310 may direct the cargo vehicle 1104A to remain at the location 1202B even if the additional charge is not needed for the tender vehicle 1102B to power the cargo vehicle 1104A over an upcoming leg of the trip (e.g., the leg extending from the location 1202B to the location 1202C). This may delay movement of the cargo vehicle 1104 along the trip to avoid needlessly adding to the congestion of the transportation network 1200, while ensuring that the cargo 1116 arrives within the designated time slot.

The energy management device 1310 may direct a tender vehicle 1102 to be moved by (or move with) another tender vehicle 1102 and/or cargo vehicle 1104 to another location for charging the tender vehicle 1102. For example, the power sources 1106 onboard the tender vehicle 1102C at the location 1202C may be depleted of energy or may not have sufficient stored energy to allow the tender vehicle 1102C to power itself to move to another location (e.g., the location 1202B and/or the location 1202D). During a trip of the tender vehicle 1102B from the location 1202B to the location 1202D through the location 1202C (which may involve the tender vehicle 1102B powering a cargo vehicle 1104), the energy management device 1310 may direct the tender vehicle 1102B to connect with and push the tender vehicle 1102C, pull the tender vehicle 1102C, and/or provide electric power to the tender vehicle 1102C so that the tender vehicle 1102C moves from the location 1202C to the location 1202D or the location 1202B to recharge the power sources 1106 of the tender vehicle 1102C. This may be referred to as the tender vehicle 1102C receiving a "free ride" from the tender vehicle 1102B to a location 1202 where the power sources 1106 of the tender vehicle 1102C may be recharged.

The energy management device 1310 optionally may coordinate the concurrent or simultaneous movement of multiple tender vehicles 1102 in the transportation network 1200 to ensure that the proper amount of energy is provided to the cargo vehicles 1104 for powering the cargo vehicles 1104 to self-propel to the destination locations of the cargo vehicles 1104. This coordination may involve the energy management device 1310 directing one or more tender vehicles 1102 to couple with a vehicle system 1100 on a route 1128 between the locations 1202.

For example, the energy management device 1310 may direct a tender vehicle 1102 to approach a moving vehicle system 1100 from behind (e.g., while the tender vehicle 1102 and the vehicle system 1100 are moving in the same direction on a route 1128) and coupling with the vehicle system 1100 to join the vehicle system 1100 and provide additional energy or fuel to the cargo vehicle(s) 1104 in the vehicle system 1100. This coupling may occur while the vehicle system 1100 is moving along the route 1128 or may occur with the vehicle system 1100 stopping on the route 1128 for the coupling to occur. As another example, the energy management device 1310 may direct a tender vehicle 1102 to approach a moving vehicle system 1100 from ahead (e.g., while the tender vehicle 1102 and the vehicle system 1100 are moving in opposite directions on a route 1128) and coupling with the vehicle system 1100 to join the vehicle system 1100 and provide additional energy or fuel to the cargo vehicle(s) 1104 in the vehicle system 1100.

The energy management device 1310 may determine energy requirements for moving a cargo vehicle 1104 between locations 1202 during a trip. The energy requirement may be calculated based on vehicle characteristics (e.g., the weight, mass, height, etc.) of the cargo 1116, route characteristics (e.g., the grades and/or curvatures of the routes 1128), schedule characteristics (e.g., the speeds at which the vehicle systems 1100 are to travel to arrive at a location within a scheduled time slot, as described above), or the like. For example, the energy management device 1310 may calculate that more energy is needed for heavier cargo 1116, taller cargo 1116 (e.g., due to wind drag), inclined grades, curved sections of the routes 1128, faster speeds, etc.

The energy management device 1310 may calculate that less energy is needed for lighter cargo 1116, shorter cargo 1116, flat or downhill grades, straighter sections of the routes 1128, slower speeds, etc. The energy management device 1310 may then select the tender vehicle 1102 for including in a vehicle system 1100 during different legs (e.g., portions) of a trip with one or more cargo vehicles 1104 to ensure that the vehicle system 1100 has enough stored energy within the vehicle system 1100 over the different legs of the trip. In one embodiment, the energy management device 1310 may determine the energy that will be obtained by the tender vehicle 1102 during movement for charging the power sources 1106. For example, the energy management device 1310 may determine the energy that will be gained by the tender vehicle 1102 from dynamic braking. The amounts of energy gained from dynamic braking may be determined from previous trips of the tender vehicle 1102 and/or vehicle systems 1100. The energy management device 1310 may reduce the calculated amount of energy needed over some legs of a trip by the amount of energy that will be gained (e.g., stored in the power sources 1106) from this dynamic braking.

The energy management device 1310 may determine the times at which tender vehicle 1102 are to join or leave vehicle systems 1100 having at least one cargo vehicle 1104 based on charging rates of the tender vehicle 1102. For example, the power sources 1106 may re-charge with electric energy at speeds that are dictated by the states of charge of the power sources 1106, at speeds that are controlled or limited by the charging stations 1204, and/or at speeds that are based on other factors (e.g., based on loads on the utility grid or system). The energy management device 1310 may determine the times at which tender vehicles 1102 are to couple or decouple from cargo vehicles 1104 based on the charging rates so that the cargo vehicles 1104 are not waiting at a location of a tender vehicle 1102 while the tender vehicle 1102 charges to a state needed to complete the next leg of a trip.

Movements of vehicle systems 1100 may be coordinated with each other so that the vehicle systems 1100 may share stored power with each other. For example, multiple vehicle systems 1100 may be scheduled to travel in the same direction on the same route 1128 (and optionally to remain no farther than a designated distance from each other) so that a tender vehicle 1102 of one vehicle system 1100 may decouple from that vehicle system 1100. This tender vehicle 1102 may then accelerate or decelerate to move to another vehicle system 1100 and couple with this other vehicle system 1100. This may occur for the tender vehicle 1102 to provide additional energy to the other vehicle system 1100.

The energy management device 1310 may determine which routes 1128 are uni-directional routes and which routes 1128 are bi-directional routes and create schedules based on this determination. A uni-directional route is a route 1128 on which only a single vehicle or vehicle system may travel at a time, such as a single track of a rail network. A bi-directional route is a route 1128 on which two vehicles or vehicle systems may travel, such as parallel tracks of a rail network, different lanes of a road, or the like.

The energy management device 1310 may consider whether to hand off cargo carried by a vehicle system to another type or category of vehicles. For example, the energy management device 1310 may determine that a vehicle system may carry the cargo to a meet-up location that is within a designated distance of a final destination or delivery location of the cargo (e.g., within one mile). The energy management device 1310 may communicate a signal to another vehicle (e.g., a car, a delivery truck, etc.) and direct the other vehicle to travel to the meet-up location and receive the cargo from the vehicle system. The vehicle system may hand-off or otherwise transfer the cargo to the other vehicle at the meet-up location for the other vehicle to carry and deliver the cargo the last remaining distance to the final destination or delivery location.

The energy management device 1310 also may determine and use the bandwidth capacities of locations 1202 in creating the schedules. For example, the energy management device 1310 may determine how many tender vehicles 1102 and/or cargo vehicles 1104 may remain at a location 1202 and create the schedules so that no more vehicles 1102, 1104 than the capacity of the location 1202 are held at that location 1202 at any time.

The time needed for tender vehicle 1102 to travel between locations 1202 may be determined and used by the energy management device 1310 in creating schedules for the vehicles 1102, 1104. For example, if a tender vehicle 1102 is needed at another location 1202 from a current location 1202 of the tender vehicle 1102, the energy management device 1310 may factor in the transit time needed for the tender vehicle 1102 to travel to the other location 1202 in creating the schedule. This may involve the energy management device 1310 delaying arrival of the cargo vehicle 1104 at the other location 1202 until the tender vehicle 1102 arrives at the other location 1202 and/or is charged to at least a selected or designated state of charge.

Another characteristic of the routes 1128 that may be considered by the energy management device 1310 in creating the schedules is the quality of the routes 1128, such as the smoothness or roughness of the routes 1128. For example, if a cargo vehicle 1104 is to transport a cargo 1116 that is fragile or susceptible to damage during travel over a rougher route 1128, the energy management device 1310 may create a schedule for the cargo 1116 that avoids or reduces the distance traveled on a rough route 1128 (to the extent possible).

But, if a cargo vehicle 1104 and/or tender vehicle 1102 are to travel to a location 1202 without transporting cargo 1116 or while transporting cargo 1116 that is not fragile or susceptible to damage, the energy management device 1310 may schedule the vehicle 1102 and/or 1104 to travel over the rougher routes 1128 to arrive at the location 1202 on time. The energy management device 1310 optionally may determine upper speed limits that differ from designated speed limits of the routes 1128. For example, the energy management device 1310 may direct a vehicle system 1100 to travel slower than a route speed limit to reduce the shock and vibrations imparted on the cargo 1116 being carried by the vehicle system 1100 on a rougher route 1128.

The design of the vehicles 1102, 1104 may be used in a scalable network of assets that are strategically positioned throughout the transportation network 1200 where a network effort of charge capability and traveling range extension may exist as the number of vehicles 1102 and/or 1104 increases. As described above, the vehicles 1102 are designed to charge and re-charge as individual assets on designated charging networks or stations 204 positioned throughout the network 1200. These stations 204 may be automated in that the vehicles 1102 may pull up to a station 204 being charging the power sources 1106 via a wireless and/or automatically wired connection (e.g., a connector on the vehicle 1102 may be located such that the connector mates with a corresponding connector of the station 204 as the vehicle 1102 moves close to the station 204).

A vehicle system 1100 having at least one vehicle 1102 and at least one vehicle 1104 may pull up to a charging station 204 and the vehicle(s) 1102 may disconnect from the vehicle(s) 1104. The vehicle(s) 1102 may then begin charging the power sources 1106 onboard the vehicle(s) 1102. The vehicle(s) 1104 may then self-propel to another vehicle or vehicles 1102 at the station 204 that have power sources 1106 already at least partially charged. The vehicle(s) 1104 may couple with the other vehicle(s) 1102 to form another vehicle system 1100, which may depart from the station 1204 while the original or previous vehicle(s) 1102 remains at the station 1204 to charge the power sources 1106. This allows the vehicle(s) 1104 to keep moving in the network 1200 without having to wait for the vehicle(s) 1102 to recharge.

A charging network (formed of several or all charging stations 1204) optionally may include a mobile charging vehicle 1210 that may be deployed to vehicles 1102 at locations other than charging stations 1205. The mobile charging vehicle 1210 may be another vehicle 1102 having onboard power sources 1106. The mobile charging vehicle 1210 may move to the location of the vehicle 1102, connect with the vehicle 1102 (using wired and/or wireless connections), and transfer electric energy from the power sources 1106 onboard the mobile charging vehicle 1210.

Optionally, the energy management device 1310 may direct the vehicles 1102 to move within the network 1200 based on two or more vehicles 1102 exchanging energy to charge power sources 1106 outside of the charging stations 1204. The energy management device 1310 may examine the terrain and/or routes 1128 being traveled by a first vehicle 1102 and direct one or more second vehicles 1102 to couple with the first vehicle 1102 to share power between the first and second vehicle(s) 1102. For example, if a first vehicle 1102 is traveling toward a location where half the terrain over which the first vehicle 1102 will travel is downhill and/or will involve braking, the energy management device 1310 may send signals 1110 to one or more other second vehicles 1102 in need of charging of power sources 1106 onboard the second vehicles 1102. These signals 1110 may direct the second vehicles 1102 to travel to and couple with the first vehicle 1102. The control system 1108 onboard the first vehicle 1102 may then direct the power sources 1106 on the first vehicle 1102 to provide at least some stored energy to the power sources 1106 on the second vehicle(s) 1102. Similarly, the energy management device 201 may direct a vehicle 1102 to meet and couple with another vehicle 1102 or vehicle system 1100 to help provide additional power as requested or needed.

This sort of management of mobile charging sources may reduce the need for fixed location charging stations 1204. For example, because the vehicles 1102 may themselves be charging stations 1204 that may move throughout the network 1200, fewer stationary charging stations 1204 may be needed while meeting the energy demands of the vehicle systems 1100 traveling in the network 1200.

In one embodiment, one or more of the charging stations 1204 may inductively charge the power sources 1106 onboard vehicles 1102 as the vehicles 1102 move through or near the charging station 1204. For example, the charging station 1204 may have coils positioned in the route 1128 or in other locations where the power sources 1106 onboard a vehicle 1102 may be inductively charged. Such as charging station 1204 may be positioned in an area of reduced speed limits (e.g., in an urban area already having slower speed limits, near intersections with other routes 1128, or the like) so that the vehicles 1102 that already are moving slowly may benefit from the slower movement by at least partially inductively charging power sources 1106 of the vehicles 1102.

Figure 14:
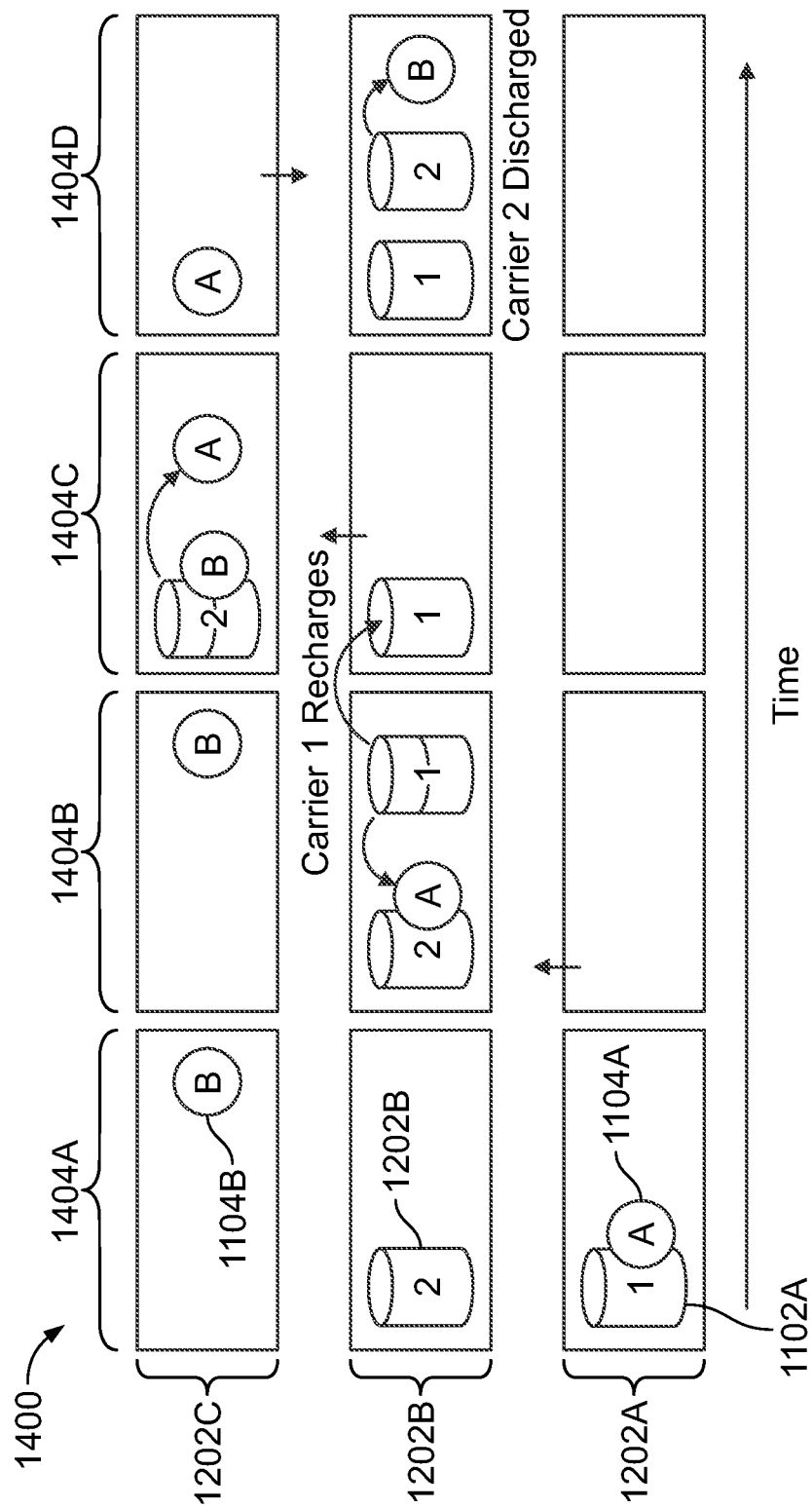
FIG. 14 illustrates one example of a movement schedule generated by the transportation network management system shown in FIG. 13.

FIG. 14 illustrates one example of a movement schedule 1400 generated by the energy management device 1310. This movement schedule 1400 is shown as a grid or matrix with each row representing a different location 1202 in the transportation network 1200 and each column representing a different scheduled time 1404A-D. In the illustrated example, the locations 1202 are locations 1202A, 1202B, 1202C, but optionally may be other locations in the transportation network 1200. The scheduled times 1404 are shown as scheduled times 1404A-D, with the time 1404A occurring before the time 1404B, which occurs before the time 1404C, which occurs before the time 1404D.

The schedule 1400 is established to move a first cargo 1116 ("A" in FIG. 14) from the first location 1202A to the third location 1202C in the transportation network 1200 and to move a second cargo 1116 ("B" in FIG. 14) from the third location 1202C to the second location 1202B in the transportation network 1200. The first cargo 1116 may be referred to as the cargo 1116A and the second cargo 1116 may be referred to as the cargo 1116B. In this example, the locations 1202A, 1202B are the same distance apart from each other as the locations 1202B, 1202C. As a result, the time needed for a vehicle system 1100 formed by a single tender vehicle 1102 and a single cargo vehicle 1104 (carrying the cargo 1116A or the cargo 1116B) to travel from the location 202A to the location 1202B is the same as each of (a) the time needed for the vehicle system 1100 to travel from the location 1202B to the location 1202C, (b) the time needed for the vehicle system 1100 to travel from the location 1202C to the location 1202B, and (c) the time needed for the vehicle system 1100 to travel from the location 1202B to the location 1202A.

Additionally, in the illustrated example, the amount of electric energy or fuel required to propel a vehicle system 1100 formed from one tender vehicle 1102 and one cargo vehicle 1104 to move (a) from the location 1202A to the location 1202C, (b) from the location 1202B to the location 1202A or 1202C and then back to the location 1202B, (c) from the location 1202C to the location 1202B and then back to the location 1202B, and so on, fully depletes the energy or fuel stored in the tender vehicle 1102 having power sources 1701 that are fully charged or full of fuel before beginning the trip.

The energy management device 1310 may determine that it takes one hour for a vehicle system 1100 formed from a single tender vehicle 1102 and a single cargo vehicle 1104 between any two neighboring locations 1202 (e.g., locations 1202 that are not separated from each other by another location 1202) is one hour. The energy management device 1310 may be notified (e.g., from an operator, from a pre-existing delivery schedule, from a manifest document, etc.) that the cargo 1116A is to be delivered to the location 1202C (from the location 1202A) in about (e.g., within 10%) two hours and the cargo 1116B is to be delivered to the location 1202B (from the location 1202C) in about three hours. The energy management device 1310 also may be instructed or have a default requirement that at least one of the tender vehicle 1102 be fully charged or full of fuel at the completion of delivery of the cargo 1116A, 1116B for delivery of additional cargo 1116.

Based on the locations of the cargo 1116A, 1116B and the tender vehicle 1102, the energy management device 1310 determines that an optimal schedule for delivery of the cargo 1116A, 1116B involves a cargo switch at location 1202B. Specifically, at the first time 1404A, a fully charged first tender vehicle 1102A connects with and powers a first cargo vehicle 1104A (having the cargo 1116A onboard) in a first vehicle system 1100 at the location 1202A, a fully charged second tender vehicle 1102B is located at the location 1202B, and a second cargo vehicle 1104B (having the cargo 1116B onboard) is located at the location 1202C. While the first tender vehicle 1102A has enough stored energy to power the first cargo vehicle 1104A to take the cargo 1116A all the way to the scheduled destination location 1202.

But, doing this would incur the cost of charging or re-fueling the first tender vehicle 1102A at the location 1202C. This would result in the cargo 1116B not being delivered to the location 1202C on time. Instead, the energy management device 1310 directs the first tender vehicle 1102A to power the first cargo vehicle 1104A to take the cargo 1116A from the location 1202A to the location 1202B (at time 1404B, which is one hour after starting movement).

The first tender vehicle 1102A then separates from the first cargo vehicle 1104A having the cargo 1116A at the location 202B and the second tender vehicle 1102B couples with the first cargo vehicle 1104A. The second tender vehicle 1102B then powers the first cargo vehicle 1104A to take the cargo 1116A from the location 1202B to the location 1202C from the time 1404B to the time 1404C to complete delivery of the cargo 1116A. The power sources 1106 onboard the first tender vehicle 1102A fully recharge or re-fuel during the time between the times 1404B, 1404C (while the second tender vehicle 1102B completes delivery of the cargo 1116A).

The second tender vehicle 1102B has half-charged or half depleted power sources 1106 at the time 1404C when the second tender vehicle 1102B couples with the second cargo vehicle 1104B. The second tender vehicle 1102B then powers the second cargo vehicle 1104B to take the second cargo 1116B to the location 1202B from the time 1404C to the time 1404D. The second tender vehicle 1102B then arrives at the location 1202B at or around the time 1404D to deliver the cargo 1116B at the location 1202B. Additionally, the first tender vehicle 1102A has fully charged or fully fueled power sources 1106, as required.

The energy management device 1310 also may schedule the concurrent movements of different types of vehicle systems based on route capacities. Different lengths of routes 1128 may be able to hold different lengths of vehicle systems based on a variety of factors, including the type of vehicle system (e.g., rail vehicle system that includes locomotives versus vehicle systems having the banker vehicle and cargo vehicle). For example, heavier rail vehicle systems may require longer distances to stop along a route 1128 in the event of an emergency (or other) brake application. But, a vehicle system 1100 formed from one or more tender vehicle 1102 and optionally one or more cargo vehicles 1104 may require significantly shorter distances to stop (e.g., less than half the stopping distance). The energy management device 1310 may direct such a vehicle system 1100 to travel ahead of or behind a rail vehicle system while the rail vehicle system moves to occupy more of the route 1128 than could be occupied by multiple rail vehicle systems. This may allow for the vehicle systems 1100 to be ingested into the flow of traffic within the transportation network without disrupting this flow of traffic. For example, a vehicle system 1100 may travel within the stopping distance of a moving rail vehicle system because the vehicle system 1100 may be able to stop before the rail vehicle system. In contrast, one rail vehicle system may not be able to travel within the stopping distance of another moving rail vehicle system because either rail vehicle system may not be able to slow in time to avoid colliding with the other rail vehicle system if an emergency or other brake application occurs. Scheduling or directing the vehicle systems 1100 to travel within the stopping distances of other vehicle systems may allow for more cargo 1116 to travel on the routes 1128 of the transportation network 1200 and may further increase the efficiency by which cargo 1116 is delivered. The vehicle systems 1100 may be introduced into the transportation network with the ability for the vehicle systems 1100 to follow or trail existing rail vehicle systems at close proximities based on the dynamically changing stopping distances. This allows for the vehicle systems 1100 to travel within the moving blocks of the rail vehicle systems, thereby utilizing more transportation network capacity to move goods without disruption of the movement of the rail vehicle systems in the same network. Priorities may be assigned to the vehicle systems 1100 based on the cargo being transported to determine where and/or when the various vehicle systems 1100 may be ingested into the spaces between the rail vehicle systems traveling in the network.

The management systems described herein also may be used to move individual and/or groups of passengers on demand between locations based on overlapping portions of the routes 1128 that are to be traveled by the passengers. For example, several vehicles 1102 and/or vehicle systems 1100 may be moving in the transportation network 1200. A first passenger at or near the location 1202B may wish to call a vehicle 1102 or vehicle system 1100 to travel in to the location 1202C. The first passenger may input a request for a vehicle 1102 or vehicle system 1100 to the scheduling device 1308 or the monitoring device 1306. The scheduling device 1308 or the monitoring device 1306 receives this request and provides the information (e.g., the location where the first passenger is requesting to be picked up, the time at which a ride is requested, the location to which the first passenger wants to travel, etc.) to the energy management device 1310. The energy management device 1310 may determine current locations of vehicles 1102 and/or vehicle systems 1100 moving in the network 1200, and select a vehicle 1102 or vehicle system 1100 that will be traveling from the location 1202B to the location 1202C at or near the time at which the first passenger wants to travel between these locations 1202B, 1202C. The selected vehicle 1102 or vehicle system 1100 may already be transporting one or more other passengers. For example, the selected vehicle 1102 or vehicle system 1100 may have a second passenger onboard that is traveling from the location 1202F to the location 1202D via the locations 1202B, 1202C. The energy management device 1310 may send a signal 1110 to the selected vehicle 1102 or vehicle system 1100 and direct the vehicle 1102 or vehicle system 1100 to stop and pick up the first passenger at or near the location 1202B.

For vehicles 1102 that are able to travel on different types of terrain (as described herein), the selected vehicle 1102 may travel to a location near the first passenger on a first type of route 1128 (e.g., a railroad track), move off the first type of route 1128, and travel to the location of the first passenger on a different, second type of route 1128 (e.g., roads). Optionally, the management system 1300 may coordinate passenger travel with other transportation systems. For example, responsive to receiving the request from the first passenger, the scheduling device 1308 may communicate with another transportation system (e.g., a taxi dispatch center, a ridesharing service, etc.) and automatically request that this other transportation system send a vehicle (e.g., a car) to transport the first passenger to the location 1202B (so that the selected vehicle 1102 or vehicle system 1100 may pick up the passenger). The scheduling device 308 also may request that this other transportation system provide a vehicle (e.g., another car) to transport the passenger from the location 1202C to a final destination location of the trip of the first passenger (if the location 1202C is not the final destination). The first passenger may then get a ride to the location 1202C as the selected vehicle 1102 or vehicle system 1100 travels through the location 1202C toward the location 1202D for the second passenger.

Figure 15:
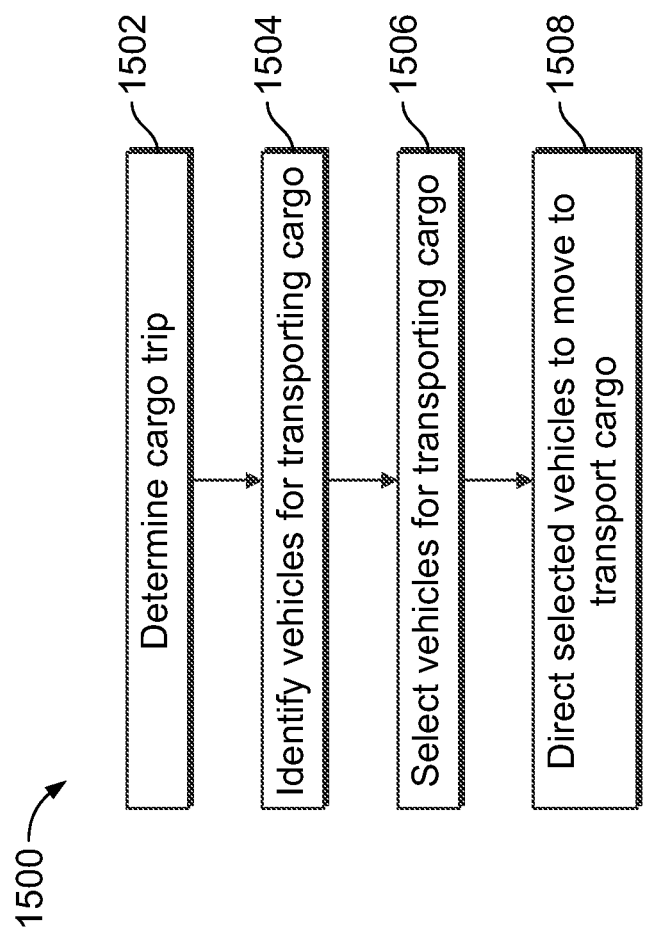
FIG. 15 illustrates a flowchart of one embodiment of a method for managing movements of vehicles in a transportation network to provide for delivery of cargo.

FIG. 15 illustrates a flowchart of one embodiment of a method 1500 for managing movements of vehicles in a transportation network to provide for delivery of cargo. The method 1500 may represent the operations or algorithm(s) performed by the management system 1300 to determine how or where to move tender vehicle 1102 and/or cargo vehicles 1104 in a transportation network 1200 to ensure that cargo is delivered on time (e.g., within designated times or time slots).

At 1502, a trip of cargo is determined. This trip may be determined by receiving one or more cargo delivery requirements. The cargo delivery requirements may dictate which cargo 1116 is to be delivered, where the cargo 1116 is located, the location to where the cargo 1116 is to be delivered, and when the cargo 1116 is to be delivered (e.g., designated time slots for delivery of the cargo 1116). Additional delivery requirements may include restrictions on which routes 1128 may be traveled during delivery of the cargo 1116. Some cargo 1116 may be too fragile or susceptible to damage to travel on some routes 1128 and some cargo 1116 may contain hazardous material that is not legally permitted to travel on some portions of routes 1128. The cargo delivery requirements may be input into the scheduling device 1308 or the monitoring device 1306 via a user interface (e.g., a keyboard, touchscreen, microphone, etc.), may be obtained from one or more trip manifests or delivery contracts, or the like.

At 1504, the availability of one or more tender vehicle and/or cargo vehicles in the transportation network is determined. The locations of the vehicles 1102, 1104 may be determined by the vehicle control systems 1108 onboard the tender vehicle 1102 communicating locations of the tender vehicle 1102 to the monitoring device 306 via the communication device 1302. The state of charge of one or more of the vehicles 1102 also may be determined. As described above, the vehicle control systems 1108 may communicate the states of charge of the tender vehicle 1102 to the monitoring device 1306.

At 1506, one or more vehicles are selected for delivering the cargo. The energy management device 1310 may select one or more tender vehicle 1102 to provide power to one or more cargo vehicles 1104 to move the cargo 1116 in the network 1200 to a destination or delivery location of the cargo 1116. The energy management device 1310 may select the vehicles 1102, 1104 based on locations of the vehicles 1102, 1104, states of charge of the power sources 1106 onboard the vehicles 1102, the amount of energy needed to power the vehicle 1104 transporting the cargo 1116 over the entire trip and/or segments of the trip, the locations of charging stations 1204, the locations and availabilities of mobile charging vehicles 1102, 1210, other cargo 1116 being moved on other vehicles 1104 in the network 1200, etc.

At 1508, the tender vehicle(s) and/or cargo vehicle(s) selected for delivery of the cargo are directed to move in the transportation network to deliver the cargo. For example, the energy management device 1310 may send signals 1110 to the vehicles 1102 to couple with the vehicle(s) 1104 carrying the cargo 1116 and power the vehicle(s) 1104 to deliver the cargo 1116. As described above, the energy management device 1310 may instruct vehicles 1102 to be swapped out during the trip, may direct the vehicles 1102 to charge other vehicles 1102 en route and/or be charged by other vehicles 1102, 1210 en route, combine with other vehicle systems 1100, or the like.

In one embodiment, a control system includes one or more processors that are configured to obtain event data associated with a vehicle. The one or more processors are also configured to receive a statement including a designated chargeable usage of the vehicle, with the statement issued by an entity, and the one or more processors further configured to access one or more rules dictating rule-based chargeable usage of the vehicle. The one or more processors are configured to compare the event data with the one or more rules to determine the rule-based chargeable usage of the vehicle based on the event data and to compare the rule-based chargeable usage with the designated chargeable usage to identify one or more discrepancies between the rule-based chargeable usage and the designated chargeable usage. Further, the one or more processors are configured to, responsive to identifying the one or more discrepancies, generate a reconciliation request for correcting the one or more discrepancies and communicate the reconciliation request to the entity that issued the statement.

Optionally, a user may apply a discount, a credit, or an offset to the reconciliation request. It may be noted that the chargeable usage may be charged, for example, as a flat fee, or as another example, as an hourly rate. The rate may be set in advance, or, as another example, may be based on an auction or bid service. Further rates may be affected by taxes (which may be included or excluded), and/or volume discounts (e.g., if multiple vehicles are rented and/or if a minimum usage threshold is met. After the reconciliation request is issued, a payment transaction may be made to satisfy or conclude the reconciliation request.

Optionally, the reconciliation request includes evidentiary support for the rule-based chargeable usage based at least in part on the event data and the one or more rules.

Optionally, at least one of the one or more processors is further configured to generate control signals for controlling an electronic device based on at least one of the rule-based chargeable usage of the vehicle or the one or more discrepancies that are identified.

Optionally, the one or more rules dynamically change based on a type of the vehicle, a type of cargo carried by the vehicle, or a user of the vehicle. In some embodiments, the one or more rules may dynamically change based on conditions. The conditions may include conditions of the vehicle and/or conditions of an environment surrounding the vehicle, for example. For example, one or more rules may dynamically change based on one or more of time of year, weather conditions, duty cycle, health of equipment or wear on equipment, demand of equipment, availability of equipment, or geographic location.

Optionally, the one or more processors are configured to identify different sets of the one or more rules and to combine two or more of the different sets of the one or more rules based on a type of the vehicle, a type of cargo carried by the vehicle, or a user of the vehicle to determine the rule-based chargeable usage.

Optionally, the event data represents one or more of entry of the vehicle into a designated area, exit of the vehicle from the designated area, loading of cargo onto the vehicle, unloading of cargo from the vehicle, repair of the vehicle, or movement of the vehicle toward the designated area.

Optionally, the event data is automatically determined by one or more input devices and the one or more processors are configured to receive the event data from the one or more input devices.

Optionally, the one or more processors are configured to, responsive to identifying the one or more discrepancies, change an amount paid by a user of the vehicle for the rule-based chargeable usage of the vehicle.

Optionally, the control system includes a scheduling device configured to determine delivery details of cargo of the vehicle, where the delivery details include a delivery location of the cargo, and wherein the event data represents the delivery details of the cargo.

Optionally, the control system includes a monitoring device configured to determine location of a tender vehicle associated with the vehicle, and an energy management device configured to direct the tender vehicle to self-propel to the vehicle, couple with the vehicle, and supply power from at least one power source onboard the tender vehicle to power the vehicle for transportation of the cargo to the delivery location.

Optionally, the one or more rules dynamically change based on operation of the tender vehicle. For example, use of multiple tenders may result in a volume discount, or if a usage threshold is met. As another example, an insurance charge may be made in connection with use of a tender vehicle (or other vehicle) to account for overuse, misuse, damage, or missed return time. Further, a state of charge fee may be applied. For example, a recharging fee may be applied if a tender is discharged or empty following a usage.

In one embodiment, a control system includes at least one electronic input device and one or more processors. The at least one electronic input device is configured to generate event data associated with a vehicle, wherein the event data relates to operation of the vehicle. The one or more processors are communicatively coupled with the at least one electronic input device and are configured to receive the event data from the at least one electronic input device. The one or more processors are also configured to receive a statement including a designated chargeable usage of the vehicle. The statement is issued by an entity. Further, the one or more processors are configured to access one or more rules dictating rule-based chargeable usage of the vehicle. The one or more processors are configured to compare the event data with the one or more rules to determine the rule-based chargeable usage of the vehicle based on the event data and to compare the rule-based chargeable usage with the designated chargeable usage to identify one or more discrepancies between the rule-based chargeable usage and the designated chargeable usage. Further, the one or more processors are configured to generate a reconciliation request for correcting the one or more discrepancies that are identified, and to communicate the reconciliation request to the entity that issued the statement.

Optionally, the reconciliation request includes a request for adjustment of the designated chargeable usage and evidentiary support for the rule-based chargeable usage based at least in part on the event data.

Optionally, the one or more rules that dictate the rule-based chargeable usage dynamically change with changing conditions.

Optionally, the control system further includes a scheduling device configured to determine delivery details of cargo of the vehicle. The delivery details include a delivery location of the cargo, and the event data represents the delivery details of the cargo.

Optionally, the control system further includes a monitoring device and an energy management device. The monitoring device is configured to determine location of a tender vehicle associated with the vehicle. The energy management device is configured to direct the tender vehicle to self-propel to the vehicle, couple with the vehicle, and supply power from at least one power source onboard the tender vehicle to power the vehicle for transportation of the cargo to the delivery location.

Optionally, the one or more rules dynamically change based on operation of the tender vehicle.

In one embodiment, a method includes obtaining event data associated with a vehicle. The method also includes receiving a statement including a designated chargeable usage of the vehicle, the statement issued by an entity. Further, the method includes accessing one or more rules dictating rule-based chargeable usage of the vehicle. Also, the method includes comparing the event data with the one or more rules to determine the rule-based chargeable usage of the vehicle based on the event data. The method also includes comparing the rule-based chargeable usage with the designated chargeable usage to identify one or more discrepancies between the rule-based chargeable usage and the designated chargeable usage. Further, the method includes, responsive to identifying the one or more discrepancies, generating a reconciliation request for correcting the one or more discrepancies and communicating the reconciliation request to the entity that issued the statement.

Optionally, the reconciliation request includes evidentiary support for the rule-based chargeable usage based at least in part on the event data and the one or more rules.

Optionally, the one or more rules dynamically change based on a type of the vehicle, a type of cargo carried by the vehicle, or a user of the vehicle.

Optionally, wherein the one or more rules dynamically change based on changing conditions.

Optionally, the event data includes details of cargo of the vehicle, wherein the event data represents delivery details of the cargo including a delivery location of the cargo.

Optionally, the method further includes determining location of a tender vehicle associated with the vehicle, and directing the tender vehicle to self-propel to the vehicle, couple with the vehicle, and supply power from at least one power source onboard the tender vehicle to power the vehicle for transportation of the cargo to the delivery location.

Optionally, the one or more rules dynamically change based on operation of the tender vehicle As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the inventive subject matter and also to enable one of ordinary skill in the art to practice the inventive subject matter, including making and using a devices or systems and performing incorporated methods. The patentable scope of the inventive subject matter is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A control system comprising:
one or more processors configured to obtain event data of one or more events associated with a vehicle, the one or more events being one or more of trigger events configured to accrue charges or termination events configured to suspend accrual of charges, the one or more processors also configured to receive a statement including a designated chargeable usage of the vehicle indicating an amount of accrued charges by the vehicle based on the one or more of the trigger events or the termination events, the statement issued by an entity, the one or more processors further configured to access one or more rules dictating rule-based chargeable usage of the vehicle,
wherein the one or more processors are configured to compare the event data with the one or more rules to determine the rule-based chargeable usage of the vehicle based on the event data and to compare the rule-based chargeable usage with the designated chargeable usage to identify one or more discrepancies between the rule-based chargeable usage and the designated chargeable usage,
wherein the one or more processors are configured to, responsive to identifying the one or more discrepancies, generate a reconciliation request for correcting the one or more discrepancies and communicate the reconciliation request to the entity that issued the statement.

2. The control system of claim 1, wherein at least one of the one or more processors is further configured to generate control signals for controlling an electronic device based on at least one of the rule-based chargeable usage of the vehicle or the one or more discrepancies that are identified.

3. The control system of claim 1, wherein the one or more rules dynamically change based on a type of the vehicle, a type of cargo carried by the vehicle, or a user of the vehicle.

4. The control system of claim 1, wherein the one or more processors are configured to identify different sets of the one or more rules and to combine two or more of the different sets of the one or more rules based on a type of the vehicle, a type of cargo carried by the vehicle, or a user of the vehicle to determine the rule-based chargeable usage.

5. The control system of claim 1, wherein the event data represents one or more of entry of the vehicle into a designated area, exit of the vehicle from the designated area, loading of cargo onto the vehicle, unloading of cargo from the vehicle, repair of the vehicle, or movement of the vehicle toward the designated area.

6. The control system of claim 5, wherein the event data is automatically determined by one or more input devices and the one or more processors are configured to receive the event data from the one or more input devices.

7. The control system of claim 1, wherein the one or more processors are configured to, responsive to identifying the one or more discrepancies, change an amount paid by a user of the vehicle for the rule-based chargeable usage of the vehicle.

8. The control system of claim 1, further comprising a scheduling device configured to determine delivery details of cargo of the vehicle, the delivery details including a delivery location of the cargo, wherein the event data represents the delivery details of the cargo.

9. The control system of claim 8, further comprising a monitoring device configured to determine location of a tender vehicle associated with the vehicle, and an energy management device configured to direct the tender vehicle to self-propel to the vehicle, couple with the vehicle, and supply power from at least one power source onboard the tender vehicle to power the vehicle for transportation of the cargo to the delivery location.

10. The control system of claim 9, wherein the one or more rules dynamically change based on operation of the tender vehicle.

11. A control system comprising:
at least one electronic input device configured to generate event data associated with a vehicle, wherein the event data relates to one or more events of the vehicle, the one or more events being one or more of trigger events configured to accrue charges or termination events configured to suspend accrual of charges; and
one or more processors communicatively coupled with the at least one electronic input device and configured to receive the event data from the at least one electronic input device, the one or more processors also configured to receive a statement including a designated chargeable usage of the vehicle indicating an amount of accrued charges by the vehicle based on the one or more of the trigger events or the termination events, the statement issued by an entity, the one or more processors further configured to access one or more rules dictating rule-based chargeable usage of the vehicle,
wherein the one or more processors are configured to compare the event data with the one or more rules to determine the rule-based chargeable usage of the vehicle based on the event data and to compare the rule-based chargeable usage with the designated chargeable usage to identify one or more discrepancies between the rule-based chargeable usage and the designated chargeable usage,
and wherein the one or more processors are further configured to generate a reconciliation request for correcting the one or more discrepancies that are identified and to communicate the reconciliation request to the entity that issued the statement, wherein the reconciliation request includes a change of an amount paid by a user of the vehicle.

12. The control system of claim 11, wherein the one or more rules that dictate the rule-based chargeable usage dynamically change with changing conditions.

13. The control system of claim 11, further comprising a scheduling device configured to determine delivery details of cargo of the vehicle, the delivery details including a delivery location of the cargo, wherein the event data represents the delivery details of the cargo.

14. The control system of claim 13, further comprising a monitoring device configured to determine location of a tender vehicle associated with the vehicle, and an energy management device configured to direct the tender vehicle to self-propel to the vehicle, couple with the vehicle, and supply power from at least one power source onboard the tender vehicle to power the vehicle for transportation of the cargo to the delivery location.

15. The control system of claim 14, wherein the one or more rules dynamically change based on operation of the tender vehicle.

16. A method comprising:
obtaining event data associated with a vehicle;
receiving a statement including a designated chargeable usage of the vehicle, the statement issued by an entity;
accessing one or more rules dictating rule-based chargeable usage of the vehicle;

comparing the event data with the one or more rules to determine the rule-based chargeable usage of the vehicle based on the event data;

comparing the rule-based chargeable usage with the designated chargeable usage to identify one or more discrepancies between the rule-based chargeable usage and the designated chargeable usage; and responsive to identifying the one or more discrepancies, generating a reconciliation request for correcting the one or more discrepancies and communicating the reconciliation request to the entity that issued the statement, wherein the reconciliation request includes a change of an amount paid by a user of the vehicle.

17. The method of claim 16, wherein the one or more rules dynamically change based on a type of the vehicle, a type of cargo carried by the vehicle, or a user of the vehicle.

18. The method of claim 16, wherein the one or more rules dynamically change based on changing conditions.

19. The method of claim 16, wherein the event data includes details of cargo of the vehicle, wherein the event data represents delivery details of the cargo including a delivery location of the cargo.

20. The method of claim 19, further comprising determining location of a tender vehicle associated with the vehicle, and directing the tender vehicle to self-propel to the vehicle, couple with the vehicle, and supply power from at least one power source onboard the tender vehicle to power the vehicle for transportation of the cargo to the delivery location.

21. The method of claim 20, wherein the one or more rules dynamically change based on operation of the tender vehicle.

* * * * *